(12) United States Patent
Dishno

(10) Patent No.: US 9,940,404 B2
(45) Date of Patent: Apr. 10, 2018

(54) THREE-DIMENSIONAL (3D) BROWSING

(71) Applicant: Aaron Scott Dishno, Riverside, CA (US)

(72) Inventor: Aaron Scott Dishno, Riverside, CA (US)

( * ) Notice: Subject to any disclaimer, the term of this patent is extended or adjusted under 35 U.S.C. 154(b) by 562 days.

(21) Appl. No.: 14/499,668

(22) Filed: Sep. 29, 2014

(65) Prior Publication Data

US 2015/0091906 A1    Apr. 2, 2015

Related U.S. Application Data

(60) Provisional application No. 61/885,339, filed on Oct. 1, 2013.

(51) Int. Cl.
*G06F 17/30* (2006.01)
*G06F 3/0481* (2013.01)

(52) U.S. Cl.
CPC .... *G06F 17/30905* (2013.01); *G06F 3/04815* (2013.01); *G06F 17/30873* (2013.01)

(58) Field of Classification Search
CPC .............................................. G06F 17/30905
USPC ......................................................... 345/427
See application file for complete search history.

(56) References Cited

U.S. PATENT DOCUMENTS

| | | | | |
|---|---|---|---|---|
| 5,555,354 A | * | 9/1996 | Strasnick | G06F 3/04815 345/427 |
| 7,425,950 B2 | | 9/2008 | Ito et al. | |
| 8,533,580 B1 | | 9/2013 | Xu | |
| 8,762,861 B2 | * | 6/2014 | Hyndman | G06F 9/4443 715/757 |
| 9,064,023 B2 | * | 6/2015 | Hyndman | G06F 3/04815 |
| 9,762,641 B2 | * | 9/2017 | Van Wie | H04L 65/605 |
| 2002/0105551 A1 | * | 8/2002 | Kamen | G06F 3/04815 715/850 |
| 2003/0197737 A1 | | 10/2003 | Kim | |
| 2005/0134611 A1 | | 6/2005 | Cheung | |
| 2008/0235320 A1 | * | 9/2008 | Joy | G06L 19/00 709/201 |
| 2009/0089714 A1 | * | 4/2009 | Blake | G06F 3/0481 715/850 |
| 2009/0241037 A1 | * | 9/2009 | Hyndman | H04L 65/4015 715/757 |
| 2010/0045662 A1 | | 2/2010 | Boothroyd et al. | |

(Continued)

FOREIGN PATENT DOCUMENTS

WO        2013183801 A1    12/2013

*Primary Examiner* — Jason C Olson
(74) *Attorney, Agent, or Firm* — TDFoster APC; Thomas D. Foster; Bruce Hare

(57) ABSTRACT

A three dimensional (3D) client application for web browsing is described. The 3D client is able to interpret 3D structure definitions and display 3D environments associated with various sets of websites. Each 3D environment is defined using a set of connecting grids. Each connecting grid defines spatial relationships among sets of websites associated with zones of the connecting grid. Each zone includes a set of 3D structures and is associated with a set of surrounding zones. As a user moves throughout the 3D environment, additional zones may be included in the 3D environment while some zones may be removed such that the user experiences a continuous expansive environment. A user is able to interact with multiple sets of websites included within the set of surrounding zones.

16 Claims, 29 Drawing Sheets

(56) References Cited

U.S. PATENT DOCUMENTS

| | | |
|---|---|---|
| 2011/0029907 A1 | 2/2011 | Bakhash |
| 2013/0024764 A1 | 1/2013 | Lou et al. |
| 2013/0090101 A1* | 4/2013 | Park ..................... G06F 3/147 455/414.3 |
| 2014/0114845 A1* | 4/2014 | Rogers .................. G06T 15/08 705/39 |
| 2015/0035821 A1* | 2/2015 | Andriotis ............ G06F 17/2247 345/419 |

* cited by examiner

2500

2550

THREE-DIMENSIONAL (3D) BROWSING

CROSS-REFERENCE TO RELATED APPLICATIONS

This application claims priority to U.S. Provisional Patent Application Ser. No. 61/885,339, filed on Oct. 1, 2013.

BACKGROUND OF THE INVENTION

Web browsing is ubiquitous in society. Current browsers present websites using two dimensional (2D) environments that include combinations of text, photo, and video. Such data may be presented in various formats without consistency across sites.

Existing browsers and/or other applications that allow users to receive web content and/or interact with other users require a user to provide a specific address (e.g., a uniform resource locator or "URL") or to select a specific resource (e.g., a hyperlink). Such an approach limits a user's ability to discover new content and/or resources.

Websites and web pages are isolated from one another, only connected through hyperlinks or direct access by URL. When traversing web pages the user experience is interrupted as one web page is unloaded and another web page is loaded in its place.

Existing browsers provide limited scope for a user's view of available web content. For instance, many browsers are limited to providing scrolling operations to view content outside of a current display range.

Thus there is a need for a web browsing solution that allows a user to perceive web content as a continuous, traversable three dimensional (3D) environment having consistent representations of web content, thus allowing a user to explore and interact with the content in an intuitive and efficient manner.

BRIEF SUMMARY OF THE INVENTION

Some embodiments may provide a way to view web content within a 3D environment. The 3D environment may represent web content using various topographical features, structures (e.g., buildings, rooms, etc.), portals (e.g., doors, windows, etc.), and/or other appropriate 3D elements.

A user may be able to traverse the 3D environment using various movement features provided by some embodiments. For instance, a user may be able change the view of the 3D environment (e.g., using a "pan" operation) and/or move among different viewpoints within the 3D environment (e.g., using a "walk" operation).

In some embodiments, a user may be able to configure a 3D environment by placing various features (e.g., walls, doors, etc.) within the environment. In addition, the user may be able to associate elements within the 3D environment to various web content elements (e.g., a door may be associated with a hyperlink, a room may be associated with a web page, a building may be associated with a website, etc.). Some embodiments may allow such designers to associate content with any feature of the environment (e.g., textures, colors, materials, etc. that may be used to define various physical features of the environment).

A 3D client of some embodiments may automatically interpret 2D content and generate 3D elements based on the 2D content. For instance, some embodiments may be able to automatically generate a 3D environment where each building represents a 2D website and each room within a building represent a webpage associated with the building website.

Some embodiments may automatically provide 2D content within the 3D environment. For instance, 2D text or image content may be displayed on a wall of a 3D building, on a face of a 3D sign or similar object, etc.

The 3D environment may associate content from various sources within the 3D environment. For instance, a building associated with a first website may include a doorway that connects the building to a second website, where the second website may be 2D or 3D.

Although the 3D environment may be conceptual in nature, some embodiments may be configured to represent actual physical structures, features, etc. For instance, a 3D environment may include a virtual city that represents an actual city where at least some virtual structures in the virtual city correspond to physical structures in the actual city. As another example, a building or campus may be represented as a 3D environment in order to allow users to become familiar with the physical environment of the building or campus (e.g., as an orientation guide for new students, as a destination guide for tourists, etc.). As still another example, the 3D environment may represent historical and/or fictional places or features (e.g., portions of a science fiction universe, a city as it appeared in the eighteenth century, antique machinery, etc.).

The 3D environment of some embodiments may be at least partly specified by structure definitions that use grid coordinates. Such an approach may allow for efficient use of data. For instance, lines may be specified by a set of end points. Some embodiments may specify all elements using a set of polygons defined using the grid coordinates. The grids of some embodiments may allow multiple 3D environments to be associated. The grids may specify 2D and/or 3D locations. The 2D grids may specify locations on a map, floor plan, or similar layout. The 3D grids may specify locations of various attributes in a virtual 3D space (e.g., heights of walls, slope of roofs, relative topology of the terrain, etc.). In addition to point locations and straight line paths between such locations, some embodiments may allow paths to be defined as curves, multiple-segment lines, etc. using various appropriate parameters.

Some embodiments may provide a 3D environment that includes multiple zones, where each zone may include one or more buildings, objects, etc. As a user moves through the environment, content associated with a range of surrounding zones may be loaded and displayed such that the user experiences a continuous 3D world. In addition, in some embodiments, as the user moves through the environment, zones that fall out of the surrounding range may be removed from the environment for efficient use of resources.

Users may be able to record, playback, and/or otherwise manipulate experiences within the 3D environment of some embodiments. For instance, a user may be able to generate a virtual tour of a museum or campus using a 3D world designed to match the physical attributes of the actual location.

In addition to the 3D spatial environment, some embodiments may provide additional dimensions. Some embodiments may manipulate sound from various sources within the 3D environment such that the sound is able to provide a fourth dimension to the environment. Some embodiments may attenuate virtual sound sources based on distance to a virtual user position. Such attenuation may be inversely proportional to distance in some embodiments.

The preceding Brief Summary may be intended to serve as a brief introduction to various features of some exemplary embodiments of the invention. Other embodiments may be implemented in other specific forms without departing from the spirit of the invention.

BRIEF DESCRIPTION OF THE SEVERAL VIEWS OF THE DRAWINGS

The novel features of the invention are set forth in the appended claims. However, for purpose of explanation, several embodiments of the invention are illustrated in the following drawings.

DETAILED DESCRIPTION OF THE INVENTION

Figure 1:
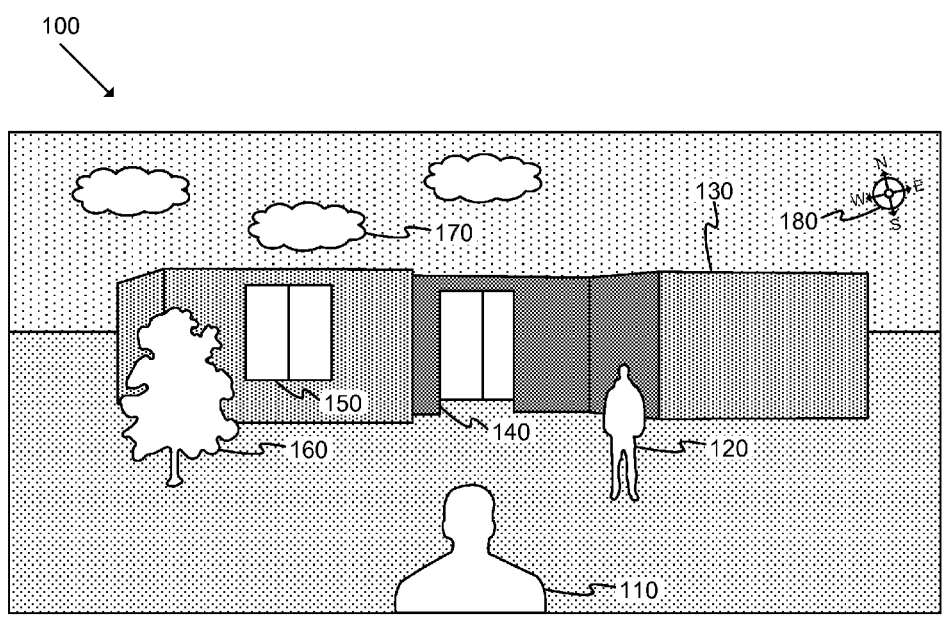
FIG. 1 illustrates a conceptual user interface (UI) presented during 3D browsing according to an exemplary embodiment of the invention.

The following detailed description may be of the best currently contemplated modes of carrying out exemplary embodiments of the invention. The description should not be taken in a limiting sense, but may be made merely for the purpose of illustrating the general principles of the invention, as the scope of the invention may be best defined by the appended claims.

Various inventive features are described below that may each be used independently of one another or in combination with other features. Broadly, some embodiments of the present invention generally provide ways to browse Internet websites as 3D environments, create custom enhanced 3D websites, connect 3D websites, animate transitions among 3D websites, and/or otherwise interact with web content within a 3D environment.

A first exemplary embodiment provides a three dimensional (3D) client application including instructions able to be executed by a processor. The 3D client application comprising sets of instructions for: receiving a selection of a first website; receiving a set of structure definitions associated with the first website; and rendering, to a two dimensional (2D) display, a 3D perspective view of a set of virtual structures at least partly defined by the set of structure definitions.

A second exemplary embodiment provides an automated method adapted to generate a 3D rendered view of 2D web content. The method includes: receiving a selection of a first website via a URL; retrieving content associated with the first website; generating a set of 3D elements based at least partly on the retrieved content; and rendering a view of the set of 3D elements to a display.

A third exemplary embodiment provides an automated method adapted to generate a continuous browsing experience. The method includes: receiving a selection of a first website via a uniform resource locator (URL); identifying a first set of surrounding websites based at least partly on a position of the first website within a connecting grid; presenting a three dimensional (3D) view of content associated with the first website and the first set of surrounding websites; monitoring a relative position within the 3D view; and determining that the relative position is within a first threshold distance of a first element within the 3D view.

Several more detailed embodiments of the invention are described in the sections below. Section I provides a glossary of terms. Section II then describes implementation and operation of some embodiments. Lastly, Section III describes a computer system which implements some of the embodiments of the invention.

I. Glossary of Terms

The following glossary of terms is presented as an aid to understanding the discussion that follows. One of ordinary skill in the art will recognize that such terms are not meant to be interpreted in a limiting manner, but rather to serve as a foundation for the discussion that follows. In addition, many conceptual terms and descriptions may be used throughout the disclosure for clarity, but one of ordinary skill in the art will recognize that such conceptual terms and descriptions may in actuality refer to various different specific features of various different embodiments. For instance, although the specification may describe various features by reference to "rooms", "buildings", "floors", etc., one of ordinary skill in the art will recognize that such terms may refer to "regions", "structures", "rectangular planes", etc., respectively.

The terms "Internet" or "web" may refer to the Internet and/or other sets of networks such as wide area networks (WANs), local area networks (LANs), related or linked devices, etc.

"Web content" or "Internet content" may refer to any information transferred over a set of networks. Such content may include information transferred as webpages. Such pages may include programming language code, style sheets, scripts, objects, databases, files, xml, images, audio files, video files, various types of multimedia, etc.

The term "traditional" may refer to conditions and functionality of the Internet and browsing using a 2D browser.

A "traditional website" (or "traditional webpage" or "traditional web content") may refer to a traditional 2D view of a webpage. Such content may be characterized by 2D representations of text, images, multimedia, audio, video, etc.

A "3D host" or "web server host" may refer to a web server connected to the Internet (and/or other appropriate networks) that supports 3D building websites and supplies the 3D client to a browser or web-based application. The 3D host may initiate a 3D browsing session.

A "3D client" or "3D browsing client" may refer to the set of computer instructions sent to and executed locally on the client web browser, software application, mobile application, and/or comparable element. The 3D client may operate throughout a 3D browsing session. The 3D client may include, for example, user input event listeners that send client activity traces back to the hosting system, output rendering code which interprets various objects and structure definitions, view manipulation code which creates animated views such as pan and walk, and code to display design grids and maps. Running these functions on the client may allow the 3D browsing session to continue while object web content and structure definitions change through hidden or concealed webpage updates.

A "3D browsing session" may refer to the user experience provided during 3D browsing provided by some embodiments (e.g., the experience started when a 3D client is downloaded and initialized and ended when a browser is closed or the 3D client is exited). The 3D client may be reloaded or a webpage may be refreshed to initialize each 3D browsing session.

A "3D view" or "3D rendered view" or "rendered view" or "screen view" may refer to the multimedia output provided to a user by some embodiments. The 3D view may include numerous polygons situated relative to an artist or architecture point or multipoint perspective using. Some embodiments may include features such as, for example, shadow gradients, strategic lighting, CSS styles, 3D audio, images, structures, and/or objects.

"Perspective" or "3D perspective" may refer to an artist or architectural point perspective rendering of a structure characterized by diminishing structure and object sizes as the virtual distance from the viewer increases. As an example of perspective, the top points of a wall that are specified to have the same height are rendered at different heights in order to show a decrease in height as distance from the user's perceived grid point increases. Similarly, a long street directly in front of the user's view would narrow until the street appears to touch off into the distance at the horizon of the projected plane.

A "3D world" or "virtual world" or "3D environment" may refer to a virtual environment including one or more 3D structures. The virtual world may provide a perception of a 3D world provided by the rendered view of some embodiments. The scope of a 3D world may range from a single structure to multiple galaxies. Some 3D worlds may represent actual structures, cities, countries, continents, planets, moons, or even the Earth itself. A walk path within a 3D world does not have to conform to real-world limitations. For instance, perception of gravity may be altered or non-existent.

A "3D structure" or "structure" may refer to an element such as a 3D rendered building, room, object, etc. Structures may be defined using grids and presented using 3D perspective.

A "3D building website" or "building website" or "building" may refer to a 3D website as represented in a 3D view. Such a website may host structure definitions and objects that contribute to creating the 3D view. Alternatively, a website lacking such definitions may be converted into a 3D building website by some embodiments. As an example of such conversion, hypertext markup language (HTML) and/or cascading style sheets (CSS) may be interpreted and used to define a set of 3D structures. The scope of a building may be equivalent to a web domain and may include 3D structures, other buildings, objects, areas and/or spaces. Buildings may include one or more rooms and may connect to other buildings or rooms in any direction and dimension including vertical connections as floors.

An "object" may refer to a 3D construct that may be viewable, project audio, and/or be otherwise perceivable in 3D rendered views. Examples of objects include, for instance, people, animals, places, or physical elements (i.e., anything that occupies or may be created in virtual space). A 3D construct may also include one and/or 2D items (e.g., a view of a classic webpage displayed on a wall in a room). Objects may refer to all web content including multimedia (e.g., video, audio, graphics, etc.). Objects may be able to change position based on automation, controlled input, and/or other appropriate ways.

A "room" may refer to a 3D webpage. The scope of a room may be equivalent to a webpage and may be defined as a segment or partition of a building (and/or 3D structure, object, area, space, etc.). Rooms may include sub-elements such as structures, objects, areas, and/or spaces.

A "floor" may refer to the plane defined by a set of building elements having a common elevation. Additional floors may be created by stacking structures and/or rooms vertically within a building. Similar to building floors in the real world, the first floor may be the ground level floor, and floors may proceed upwards for multilevel structures or downwards to represent below-ground levels of a structure.

A "base line" may refer to a line that defines and represents the location of a wall. Base lines may each include a start point and end point. The path between the start and end point may be defined in various ways (e.g., a straight line, curve, arc, freeform path, etc.). Within a 3D rendered view, base lines may be perceived as the lines, arcs, curves, or other definable segments that represent the bottom of a wall.

A "wall" may refer to any 3D view representation created from a base line. A wall may appear solid and opaque and/or use gradients gradients to enhance the look of the 3D rendered view. In a typical rendering, users may not be able to walk through walls unless a door is provided and cannot see through walls unless a window is provided. In some cases, a door or a window may consume all of a wall.

A "wall segment" may refer to a division of a wall used to surround a window or a door. Left and right wall segments next to a door or window may be defined as polygons. For example, on the left the polygon may be defined by: the wall base line start point, the window or door base line start point, the wall top point above the window or door, and the top point above the start point of a wall base line. The upper wall segment above a window or door may include the portion of the wall rendered directly above the window or door on the screen view. Similarly, the lower wall segment below a window may include the portion of the wall rendered directly below the window on the screen view.

A "ceiling" may refer to the plane that may be created by graphing the top points of walls within the same structure. When a user is located within the walls and pans up, for instance, the ceiling may be revealed.

A "roof" may be identified using the same top points of walls within the same structure as a ceiling, but may represent the opposing side of the plane. The roof may normally be referenced as seen from the outside of the structure and from a top view point panning down.

A "definition file" may refer to a manifest of settings used to create 3D rendered views. Some definition files may be specifically designed for use by the 3D browsing client to render 3D structures, while web programming languages that produce, for example, HTML and CSS, may be interpreted and converted into 3D structures for the 3D client. The definition files may include information transferred to the 3D client to render the element(s) on the client output device or user device (e.g., a smartphone, tablet, personal computer (PC), etc.). Examples of such information include: graph points, colors, styles, textures, images, multimedia, audio, video, and any other information used to describe structures and objects connected to (and/or otherwise associated with) the 3D element.

A "building definition" may include a manifest of all information related to a building.

A "structure definition" may include a manifest of all information related to a structure.

A "base line definition" may include a manifest of information related to a base line. The base line definition may include, for instance, start point coordinates, end point coordinates, color or graphics for the inside of a wall, color or graphics for the outside of a wall, styles, and/or other appropriate defining characteristics.

A "base line definition" may also include a manifest of all information required to render a wall polygon. The base line definition may include base line point coordinates and/or any other information required to generate the desired visual and or audio effect. Such information may include, for instance, definable line segment information, wall colors, applied graphics, objects to be projected on the wall, wall height adjustments, perspective adjustments, styles, gradients, lighting effects, audio, multimedia, etc.

A "global grid" may refer to a connecting grid or graphing coordinate system that associates one or more sub-grids. Such sub-grids may include grids associated with countries, cities, communities, buildings, rooms, and/or other appropriate grids. The scope of a global grid may be equivalent to a planet or galaxy. Global grids may be used to associate multiple global grids. The use of global grids may allow for an increase in the number of coordinates included in a set of connecting grids in order to accommodate expansion between any two points.

A "connecting grid" may refer to a coordinate system that defines the relative placement, facing direction, and alignment properties of layered grids. Such grids may be used to associate other grids. Although they can, most connecting grids do not represent literal distance in the 3D World, but relative direction for the connection and order of connection of grids in any direction. Open space may often be created using room grids with few or no structures because room grids do represent literal distance. In addition, multiple websites may be associated with a connecting grid. A single website may also be associated with multiple connecting grids (and/or multiple locations within a connecting grid).

"County", "city", and "community grids" may refer to specific types of connecting grids. A county grid may refer to a coordinate system that defines the relative placement, facing direction, and alignment properties of one or more city grids. A city grid may be a coordinate system that defines the relative placement, facing direction, and alignment properties of one or more community grids. A community grid may refer to a coordinate system that defines the relative placement, facing direction, and alignment properties of one or more building grids. These grids are all examples of intermediate grids and exist under many other names (e.g., state grids, country grids, region grids, etc.) all for the same purpose of grouping other grids.

A "building grid" may refer to a coordinate system that defines the relative placement, facing direction, and alignment properties of a set of room grids. In some embodiments, rooms defined on room grids cannot overlap when connected on a building grid if the logic of door connections between the rooms and consistent views out windows remains intact, which may not be necessary in a virtual world. A building grid may represent, for instance, the scope of a web folder.

A "design grid" may refer to a room grid that provides the ability to edit, add, and remove objects, walls, doors, windows, and/or other features. The design grid may include various edit tools. "Edit tools" may refer to a collection of elements that may be used to edit, create, remove, append multimedia, color, and style structures and objects.

On a design grid, the first side of a wall may be the side closest to the top or left screen borders and the second side may be the opposing side. A "map" may refer to a room grid without the ability to edit, add, or remove objects, walls, doors, windows, etc. The main purpose of a map may be to provide an overview of the structures and objects for navigating within a 3D world.

"Grid points" may refer to coordinate points on a design grid or map. Grid points may be used to represent the relative location of objects, structures, base lines, etc. Grid points may also be used to associate sets of grids.

"Screen points" may refer to any coordinate point on a device output (e.g., a touchscreen, a monitor, etc.). Screen points may be generated by the 3D client to project a 3D view based at least partly on grid points, structure definitions, and objects.

A "room grid" may refer to a grid that serves as the primary two dimension design grid and may be used to add walls, doors, windows, and objects to define structures that are utilized by the 3D rendered views. Room grids do not have to be a 2D plane, the grids may also represent contours of the ground and curvature (e.g., as found on Earth's surface) using longitudinal and latitudinal grid coordinates. Rooms via room definitions may be created based on such a coordinate system. The room grid also provides the browsing 2D map. Unlike connecting grids, room grids represent literal distance in a 3D world. Room grids do not require building grids to be included on other connecting grids. Multiple structures may be defined on a single room grid. For an example of relative web content purposes, a room may be equivalent to the scope of a webpage.

A "floor grid" may refer to the design grid, room grid, or map that creates the plane in which the baseline coordinates are defined (i.e., the "floor" of some embodiments).

"Start points", "end points" and/or "base line coordinates" may refer to coordinate points on a design grid or map used to define base lines, object locations and/or properties, door locations and/or properties, and window locations and/or properties. Each start point may be defined as the closest line end point to the top left corner of the screen or grid, while the end point may be defined as the other end point associated with the base line. The start point and end point of a particular base line may be cumulatively referred to as the "end points" of that base line.

"Top points" may refer to screen points generated to create a 3D view or wall from a base line. Top points are the key to creating a polygon from a base line. When referring to a window or a door, each set of top points refers to the upper two screen points of a window or door polygon.

"Bottom points" may refer to the lower set of screen points of a window or door polygon. On most doors, the bottom points are the same as the end points of the door object because most door polygons shown on a screen project from the base line of a wall.

A "door" may refer to any connector between buildings or rooms (or building grids or room grids respectively). A door may associate multiple room grids to produce continuous coordinates that are able to be translated into a single 2D grid that may be used as a map or design grid and/or to generate 3D views for output to users. Buildings or rooms do not necessarily have associated walls or objects and may represent areas or open space in a virtual world while still providing access to adjoining building or room grids. The door may allow the next structure definitions to be loaded before a user walks to a location within a different room. When a door exists on a wall, the door may allow users to walk through (and/or guide through) the wall using the visually defined virtual opening.

A "window" may refer to any opening that allows users to view structures, objects, etc. beyond the current room, but may not allow users to walk to the visible adjoining room or structure. When a window is placed on a wall, the window allows users to view structures and objects located outside the opposing side of the wall. Windows may not allow the users to walk through to an adjoining room. Similarly to an actual structure, a door defined in the shape of a window may allow users to walk through to an adjoining room, whereas a window in the shape of a door may not allow users to walk to an adjoining room. Windows may have boundaries that may be used to trigger loading and unloading of structure definitions.

A "zone" may refer to the area that includes a set of buildings and any surrounding region. The zone may make up a space that defines a website. Borders of a zone may be boundaries or boundary triggers able to start processes to load or unload structure definitions, for instance.

A "zone anchor" or "anchor grid coordinate" or "anchor" may refer to a particular point within the zone (e.g., the left bottommost coordinate in use by the zone). This x, y, z grid coordinate value may tie or align other zones of any size to a connecting grid of some embodiments.

A "boundary" may refer to a strategic trigger point usually set as a radius or rectangle around a door, window, zone, building, room, or structure. When a user passes a boundary, building grid(s), room grid(s), and corresponding structure definition(s) may be loaded or unloaded into the current 3D view. When such a threshold is crossed, a background process may retrieve a second website (via URL or other appropriate resource) while the existing view (representing a first website) is maintained. In addition, content associated with the second website may then be added to the content of the first to create one consistent adjoining 3D view. Such a view may be extended to include multiple other websites within one coherent uninterrupted view and user experience.

"Stairs" may refer to any door or other connection that allows users to walk to different floors or otherwise traverse virtual elevation changes. Stairs may include but may be not limited to stairways, escalators, elevators, vacuum tubes, inclines, poles, chutes, ladders, slides, and terraforming ground. For the purposes of walking, as provided by some embodiments, stairs and doors may be interchangeable.

A "user" may refer to an individual interfacing with the input and output devices. User may also refer to a first person viewpoint within 3D rendered views. For example, when the user walks or pans, the individual providing input to the system and the virtual user in the 3D rendered view may experience a panning or walking action as the system renders animated structures to simulate the movement.

An "event listener" may refer to an automated process that continually monitors user input and triggers other processes based on the type of input event. For example, an event may be a left mouse click that when captured by the event listener triggers a select object process that highlights a door or window on a design grid.

"Pan" or "panning" refers to altering the 3D viewpoint left, right, up, down, or any combination thereof. The pan view may change in response to user inputs such as mouse movements, touch gestures, movement interpreters detected through event listeners, and/or other appropriate inputs. Panning a user view ideally simulates a person standing in one location and looking in any direction as a combination of up, down, left, and right.

A "horizontal angle" may refer to the angle of rotation of the screen view in a horizontal (or left/right) direction. The horizontal angle may be changed by a user during a pan operation.

A "vertical angle" may refer to the angle of rotation of the screen view in a vertical (or up/down) direction. The vertical angle may be changed by a user during a pan operation.

"Walk" or "walking" may refer to altering the 3D viewpoint forward, reverse, left, right, or any combination thereof. The walk view may be in response to user inputs such as mouse movements, touch gestures, movement interpreters detected through event listeners, and/or other appropriate inputs. Walking a user view ideally simulates movement in any direction. Walking used in this context may be any mode of transportation or speed of simulated movement such as walking, running, sliding, driving, flying, swimming, floating, warping, etc.

"3D audio" may refer to changes in volume or depth of sounds based on changes to the position of a user relative to a sound source. Using a stereo speaker object in a 3D rendered room as an example, when a user walks toward a speaker and the rendered drawing on the screen appears to get closer to the speaker, sound that may be identified as being provided by the speaker would increase in volume (or decrease as the user walks away from the speaker). If the speaker is visually blocked, for instance by a wall or closed door, the volume of the sound would decrease or even be reduced to zero. Using the same principle, sounds that originate from any structure or object within the 3D view may be affected by position, movement, obstacles, etc.

The term "hot swapped" may refer to a process whereby structure definitions are quickly changed for the screen view such as to provide new buildings in addition to previous buildings that were adjacent to the user thus providing the appearance of uninterrupted flow and animation of the currently rendered scene. 3D buildings at a distance behind a walking user may disappear from view, while new 3D buildings at a distance in front of the user may appear in view.

A "hyper active website" may refer to a website that not only provides active web content but includes a lively interface that allows constant manipulation of the webpage appearance. A 3D building website may be a hyper active website because the 3D building website not only provides active web content in the form of 3D structures and objects, but also allows users to pan and walk among the 3D structures during a 3D browsing session.

A "kiosk" may refer to an object on a building grid that allows the virtual user to interact with and/or provide input via a website. Interactions may include form submittals, text box entries, selection buttons, event triggers, voice commands, camera inputs, biometric gathering of data, etc.

II. System Implementation and Operation

A. Overview

Some embodiments provide 3D rendered views of web content. Such views may be characterized by conceptually replacing websites with buildings or structures, traditional webpages with rooms, and hyperlinks with doors between rooms, buildings, or zones. Some embodiments may provide 3D structure constructs, building constructs, room constructs, wall constructs, connecting grids, avatars, moving objects, 3D location tracking, 3D sound, and/or playback controls for use during Internet browsing using the 3D client.

Utilizing the 3D client, custom structure definitions may be loaded and displayed as 3D views by some embodiments. In addition, traditional web content or webpages may be loaded and converted into structure definitions and be rendered as 3D views by some embodiments.

The 3D client of some embodiments may be conceptually similar to applying an alternate lens for viewing the Internet (and/or other network-based content). Webpages may be translated by web browsers, mobile devices, hardware, firmware, and/or software. Rather than viewing images, multimedia, text, hyperlinks, and lists on a flat 2D webpage, some embodiments render 3D structures, buildings, and objects to the user's screen while traditional web content may be rendered onto walls of 3D structures, buildings, and/or objects as users virtually walk down streets and in and out of buildings, structures, houses, rooms, etc.

Some embodiments may allow a user to pan and/or walk in or around the 3D environment. Website to website navigations may include continuous animated transitions. Some embodiments may use elements such as grids, definitions, etc. via programming languages like HTML and/or CSS to generate 3D sites. Such sites may include polygons that visually resemble 3D structures. The views may utilize shading, lighting effects, perspective, coloring, sizing, and/or other appropriate effects to achieve a desired presentation. Some embodiments may include advanced rendering operations such as red-blue use of colors that may be viewed through 3D glasses to make the image appear to take on 3D properties in a visual perspective illusion that extends beyond the limitations of the video screen. Some embodiments may allow users to virtually interact with various 2D and 3D objects and structures.

FIG. 1 illustrates a conceptual UI 100 presented during 3D browsing according to an exemplary embodiment of the invention. The UI may represent a 3D building website. Different embodiments may include different specific UI elements arranged in various different ways.

As shown, the example UI 100 includes a first avatar 110, a second avatar 120, a building 130, a door 140, a window 150, a tree 160, clouds 170, and a compass 180.

The walls of the building 130 may be colored, have shading, lighting effects, textures (e.g., brick face), display images, and/or be otherwise appropriately configured. The doors 140 and windows 150 may reveal parts of the inside view of the building walls. In the center foreground may be the user's avatar 110 that travels through the virtual world 100 based on user inputs associated with movement. Objects such as another user's avatar 120, animals, trees 160, shrubbery, clouds 170, and compass rose 180 may move based on various factors (e.g., user interaction, inputs received from other users, default routines, etc.). Avatars and movable objects will be described in greater detail in subsection II.L below.

B. Representation of Websites as Buildings

Some embodiments conceptually replace websites with buildings, structures, and objects that are associated using grids to form virtual communities. In this way, a perception of the Internet as virtual communities or cities of buildings instead of independent websites and webpages may be realized. Users may be able to virtually pan, walk, and interact with animated views, thereby providing an alternate appearance, interaction, and/or perception of the Internet and web browsing.

Websites may be designed by programmer-users to include layouts, designs, and architecture of the 3D structures, buildings, rooms, and objects. Website programming may be also enhanced by allowing the web content to be rendered to various walls or geometric planes (and/or other appropriate features) of the 3D structures, buildings, rooms, and/or objects.

Rather than a set of discrete pages, some embodiments provide a continuous 3D browsing session. The user may pan the view to look around and walk the view as an alternative to clicking links and opening new webpages. As the user virtually walks down a virtual street, the buildings that line the streets may be virtual representations of websites from anywhere on the Internet. The maps of the cities and building placements may be formed using connecting grids of some embodiments. Each connecting grid and optionally adjoined connecting grid or grids may represent a virtual world that may be browsed, for instance using pan and walk, with nonstop animation. Thus, some embodiments may associate a building with a construct that defines the scope of a website.

Similar to a website having a conglomeration of webpages, a building may include a collection of rooms. A room may form all or part of a building. Rooms in a 3D browsing session may conceptually replace traditional webpages. A traditional webpage may include multiple webpages in one view that uses frames or otherwise divides a webpage. During 3D browsing provided by some embodiments, a room may utilize walls to host the equivalent of multiple webpages or divisions thereof.

Panning and/or walking the view may provide a similar experience as a traditional scrolling operation and walking the view past a boundary (e.g., by walking through a door) may be equivalent to clicking a hyperlink and opening a new webpage. Thus a door (and/or any associated boundary) may be analogous to a traditional hyperlink. Similarly, a window may be analogous to embedded content (e.g., a video player that is associated with a different website, a display frame that is associated with content from a different web page or site, etc.).

Figure 2:
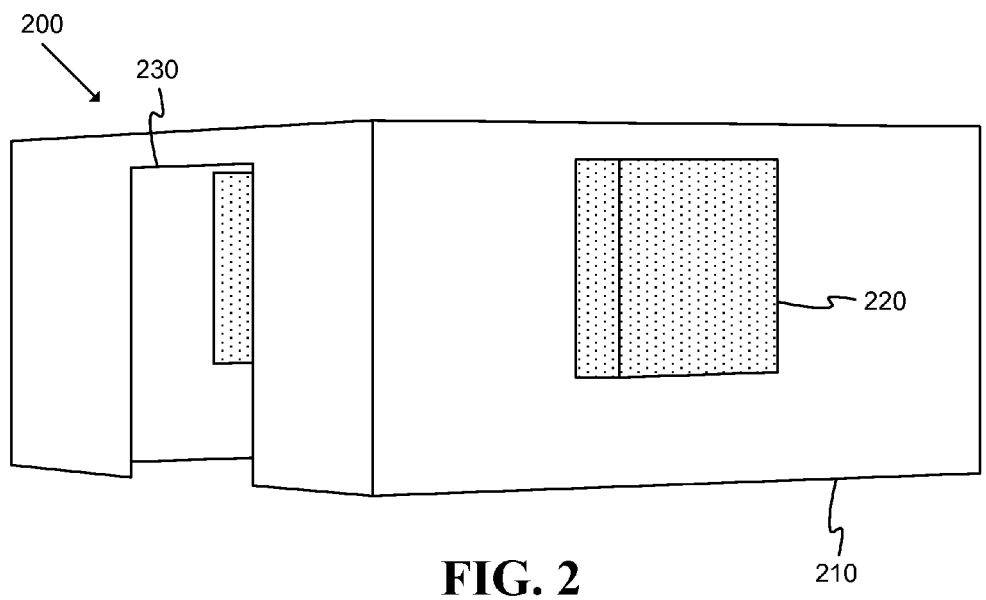
FIG. 2 illustrates a conceptual UI of some embodiments including a basic rendered structure.

FIG. 2 illustrates a conceptual UI 200 of some embodiments including a basic rendered structure 210. The structure in this example is a building with a single room. The structure has four walls generated from four base lines that form a square when viewed from the top. The structure includes two windows 220 on opposing sides and an open door 230 on another side. When a window or door is located within a wall, the wall may be formed by a set of wall segments that leave a void rectangle in the wall.

A UI such as UI 200 may be rendered by the 3D client from a structure definition that includes end points for the four base lines, window end points defined on the two opposing base lines, and door end points defined on another base line. The addition of polygons using top points, walls, color gradients, shading, 3D perspective, horizontal rotation, and vertical rotation of the structure may be generated by the 3D client to produce the screen view for the user.

Figure 3:
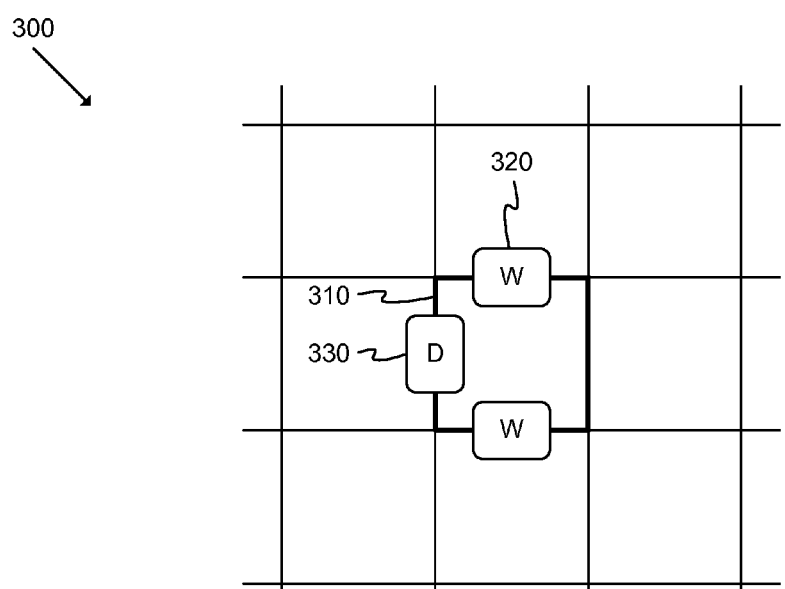
FIG. 3 illustrates a schematic block diagram of a conceptual floor plan of some embodiments for the basic rendered structure of FIG. 2.

FIG. 3 illustrates a schematic block diagram of a floor plan 300 of some embodiments for the basic rendered structure 210. This design grid view 300 shows the relative arrangement of the base lines 310, windows 320, and door 330. The viewpoint shown in FIG. 2 may be associated with a grid point to the lower left of the structure with a horizontal rotation of approximately forty-five degrees right and vertical rotation of approximately fifteen degrees down.

Figure 4:
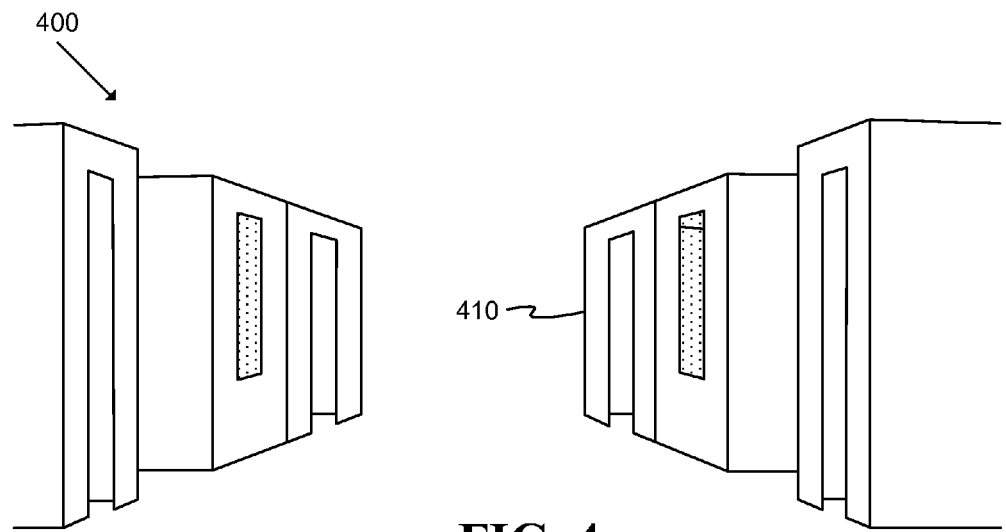
FIG. 4 illustrates a conceptual UI of some embodiments including multiple structures.

FIG. 4 illustrates a conceptual UI 400 of some embodiments including multiple structures 410. UI 400 shows the conceptual rendered 3D perspective.

Figure 5:
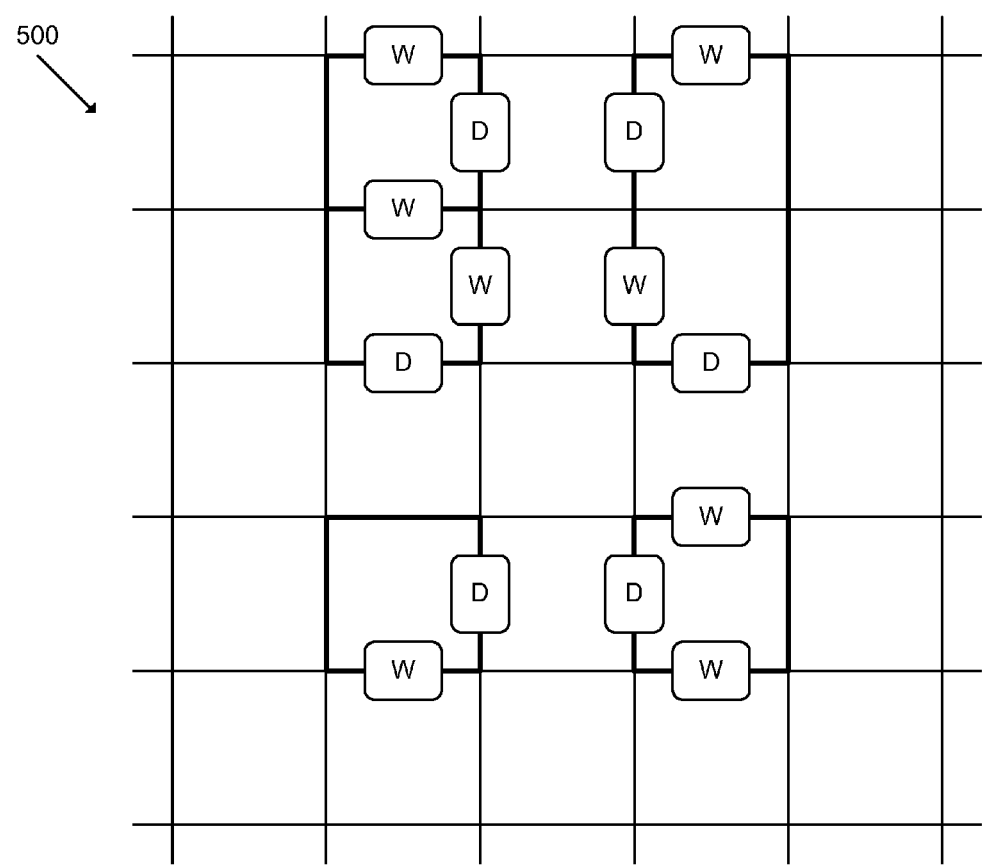
FIG. 5 illustrates a schematic block diagram of a floor plan of some embodiments for the multiple structures shown in FIG. 4.

FIG. 5 illustrates a schematic block diagram of a floor plan 500 of some embodiments for the multiple structures 410. The viewpoint shown in FIG. 4 may be associated with a grid point to the lower center of the grid with no horizontal rotation and vertical rotation of approximately twenty degrees down.

C. Rendering 3D Objects

Some embodiments may be able to render 3D structures in the form of buildings, rooms, walls, and objects based on minimal amounts of information. The 3D client may utilize a minimum amount of information in the form of definition files to create the interactive 3D animated screen views.

Figure 6:
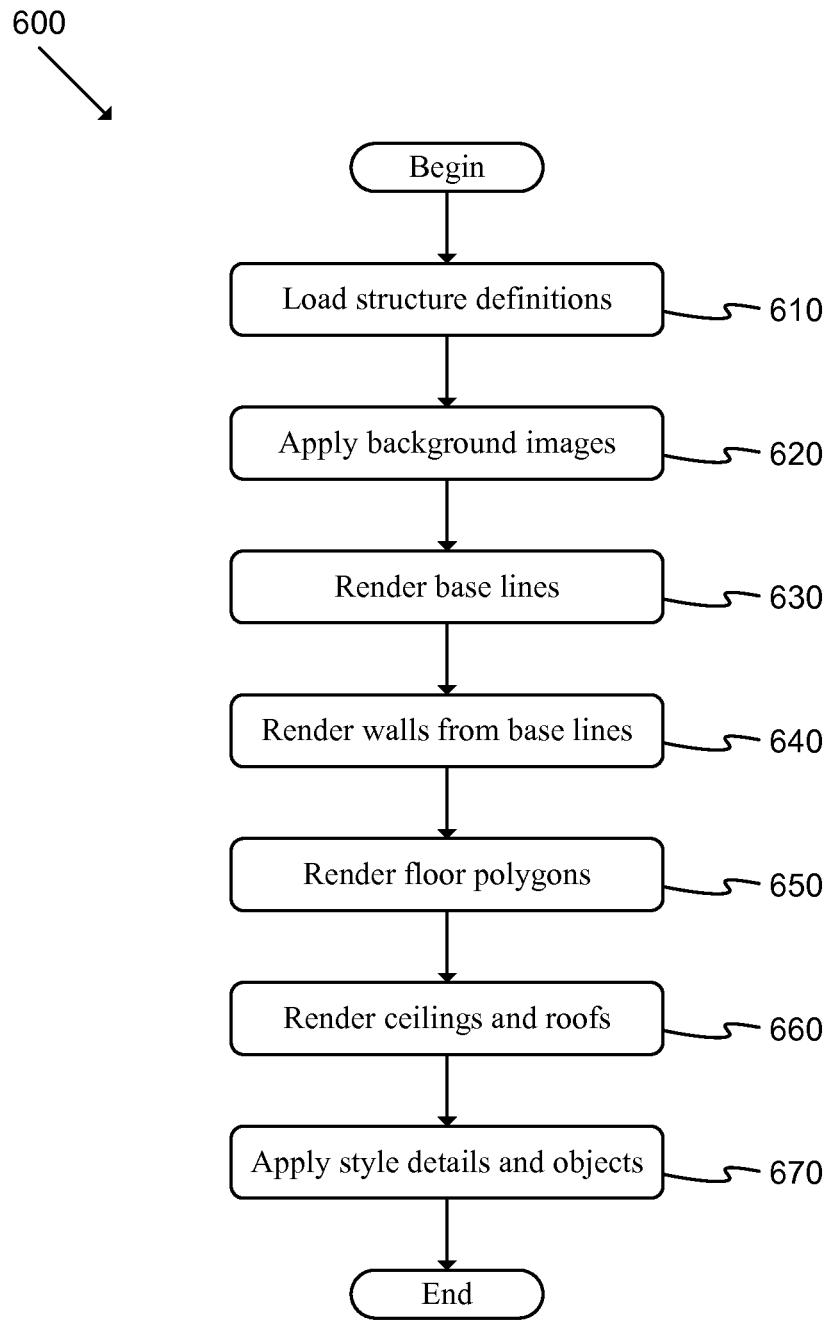
FIG. 6 illustrates a flow chart of a conceptual process used by some embodiments to render a screen view.

FIG. 6 illustrates a flow chart of a conceptual process 600 used by some embodiments to render a screen view. Such a process may begin, for instance, after a user launches a 3D client, when a browser is opened, etc.

As shown, the process may load (at 610) structure definitions. Next, the process may load and apply (at 620) background images. These background images may show ground and sky separated by a horizon and may become part of the perspective visual experience.

Process 600 may then render (at 630) base lines from the structure definitions. Next, the process may render (at 640) walls from the base lines. The process may then render (at 650) floor polygons that are at least partially defined by the base lines. Next, the process may render (at 660) ceilings and roofs using the top points of the walls.

Finally, the process may apply (at 670) style details and objects provided by the structure definitions and then end. In some cases, the screen view may be completed by adding any hot spots and image map hyperlinks which may make screen objects selectable.

Figure 7:
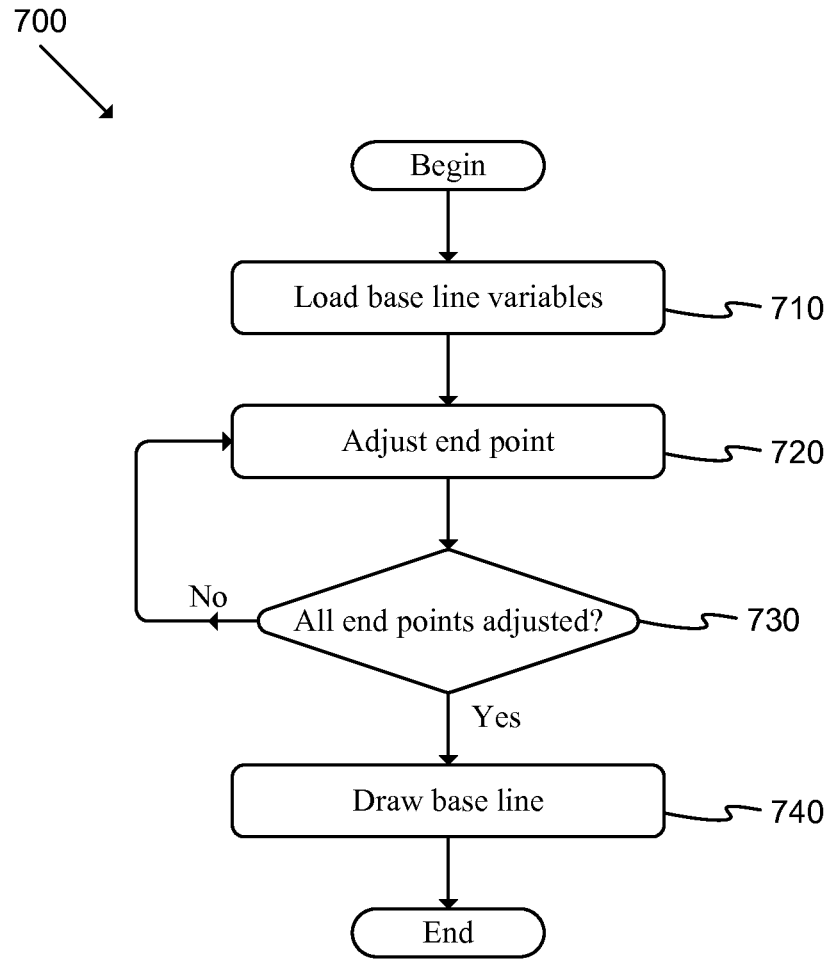
FIG. 7 illustrates a flow chart of a conceptual process used by some embodiments to render base lines.

FIG. 7 illustrates a flow chart of a conceptual process 700 used by some embodiments to render base lines. Such a process may be performed to implement operation 630 described above. The process may be executed by the 3D client of some embodiments and may begin when the 3D client identifies base lines for rendering.

As shown, the process may load (at 710) the necessary base line variables. Such variables may include, for instance, output device information (e.g., screen size, orientation, and resolution), user pan rotation angles (horizontal and vertical), user perspective for 3D point perspective calculations, and structure definitions that currently exist in the proximity of the user room grid location. In addition, the variables may specify base line coordinates, style details, and/or other features.

By using each end point of the base lines in the structure definitions in combination with the variables collected from the user input, the process may adjust (at 720) each end point (in some embodiments, the start point may be adjusted first). Such adjustment may include converting the end point coordinates (e.g., "Grid (x, y)") to usable output coordinates (e.g., "Screen (x, y)"), and modifying the output coordinates based on horizontal pan angle, vertical pan angle, and multipoint 3D perspective view. The process may then determine (at 730) whether all end points have been adjusted and continue to perform operations 720-730 until the process determines (at 730) that all end points have been adjusted.

Next, the process may draw (at 740) the base lines using style details to determine the line width, shape, curve, arc, segment path, etc. and then end. The process may be repeated for each base line included in a view.

Figure 8:
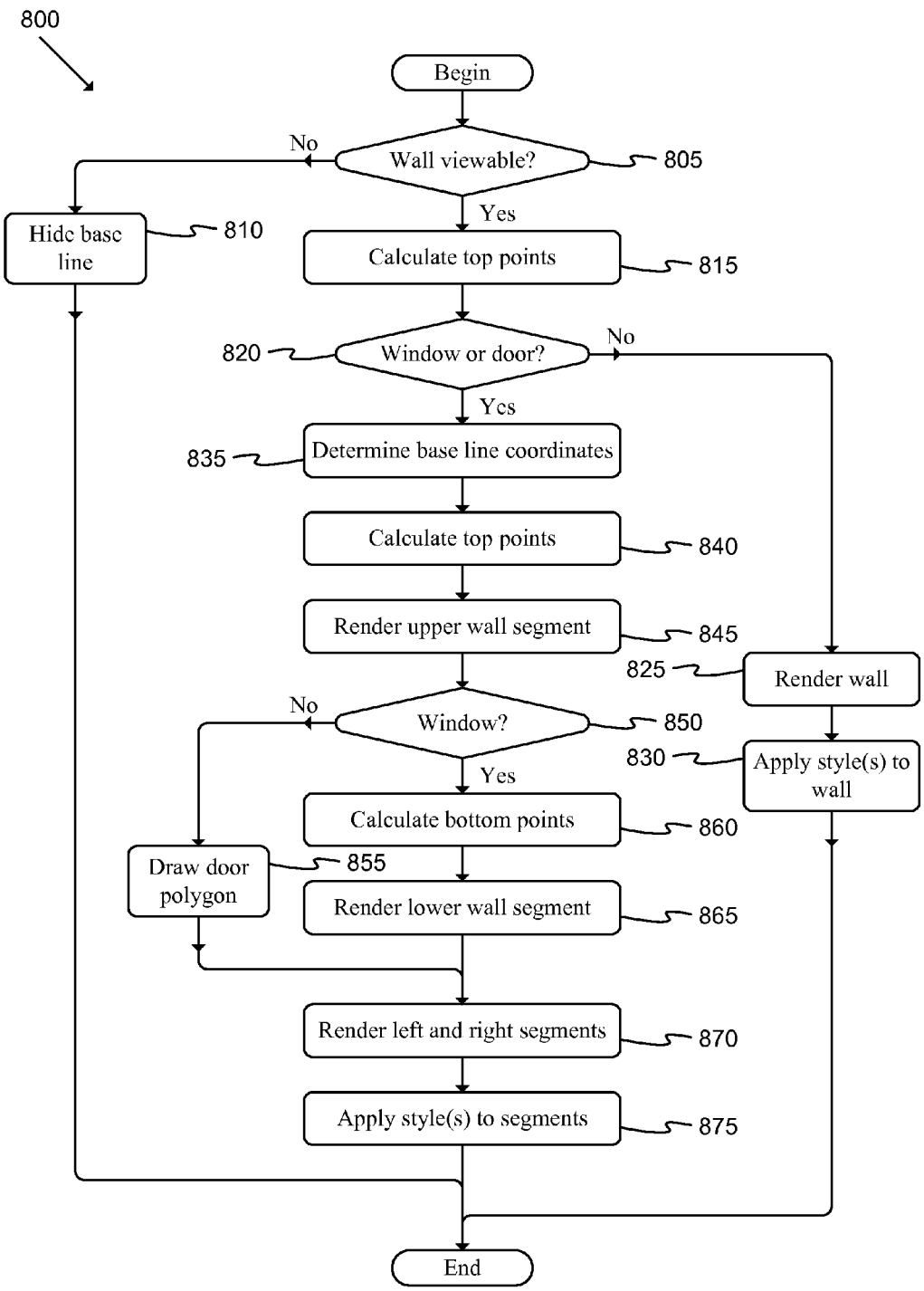
FIG. 8 illustrates a flow chart of a conceptual process used by some embodiments to render walls.

FIG. 8 illustrates a flow chart of a conceptual process 800 used by some embodiments to render walls. Such a process may be performed to implement operation 640 described above. The process may be executed by the 3D client of some embodiments and may begin after base lines have been rendered and/or identified (e.g., after completing a process such as process 700 described above).

The process may determine (at 805) whether the wall is within the viewable projection of the current screen view. Such a determination may be made for a number of reasons. For instance, some embodiments may minimize the number of rendered polygons in an attempt to minimize computer system memory requirements and execution times especially as a user pans and/or walks thus potentially triggering constant regeneration of the screen view. As another example, some embodiments may preload distant structures and objects that may take extended time, as the currently loaded objects often include many more definitions than what may be currently viewable from the user's perspective view point or screen view. As still another example, when a user walks into a structure or pans the screen view, walls that are virtually behind the user's grid coordinates at any given horizontal or vertical angle may block the user's view if drawn.

If the process determines (at 805) that the wall is not viewable, the process may hide (at 810) the base line associated with the wall, if necessary, and then may end.

If the process determines (at 805) that the wall is visible, the process may then calculate (at 815) top points of the wall. The top points may be calculated with respect to the base line end points, 3D perspective, horizontal angle, and/or vertical angle. The result may define the screen points necessary to create a polygon (when used in conjunction with the base line end points).

Next, the process may determine (at 820) whether there are any windows or doors associated with the wall. If the process determines (at 820) that there are no doors or windows associated with the wall, the process may then render (at 825) the wall, apply (at 830) any styles to the wall, and then end.

The lighting effects, gradients, colors, images, and other styles from the base line definition may be applied to the wall polygon. If there are no additional styles associated with the wall, default settings including colors, gradients for shading, and lighting effects may be applied to the wall in order to enhance the 3D rendered view.

If the process determines (at 820) that there are doors or windows associated with the wall, the process may then determine (at 835) the base line coordinates of the opening (e.g., by reading the coordinates from the base line definition). The process may then calculate (at 0840) the top points of the wall above the window or door and the top points of the window or door itself. Using the four points, the process may render (at 845), on the screen view, the upper wall segment above the door or window.

Next, process 800 may determine (at 850) whether the opening is a window. If the process determines (at 850) that the opening is not a window, the process may draw (at 855) the door polygon. The door polygon may be an animation that represents a closed, open, and/or intermediate door position.

If the process determines (at 850) that the opening is a window, the process may then calculate (at 860) the bottom points of the window using the window base line points. The process may then render (at 865), on the screen view, the lower wall segment below the window.

After drawing (at 855) the door polygon or rendering (at 865) the lower wall segment, the process may render (at 870) left and right wall segments.

Finally, the process may apply (at 875) style(s) to the wall segments, such as lighting effects, gradients, colors, images, etc. from the base line definition.

Figure 9:
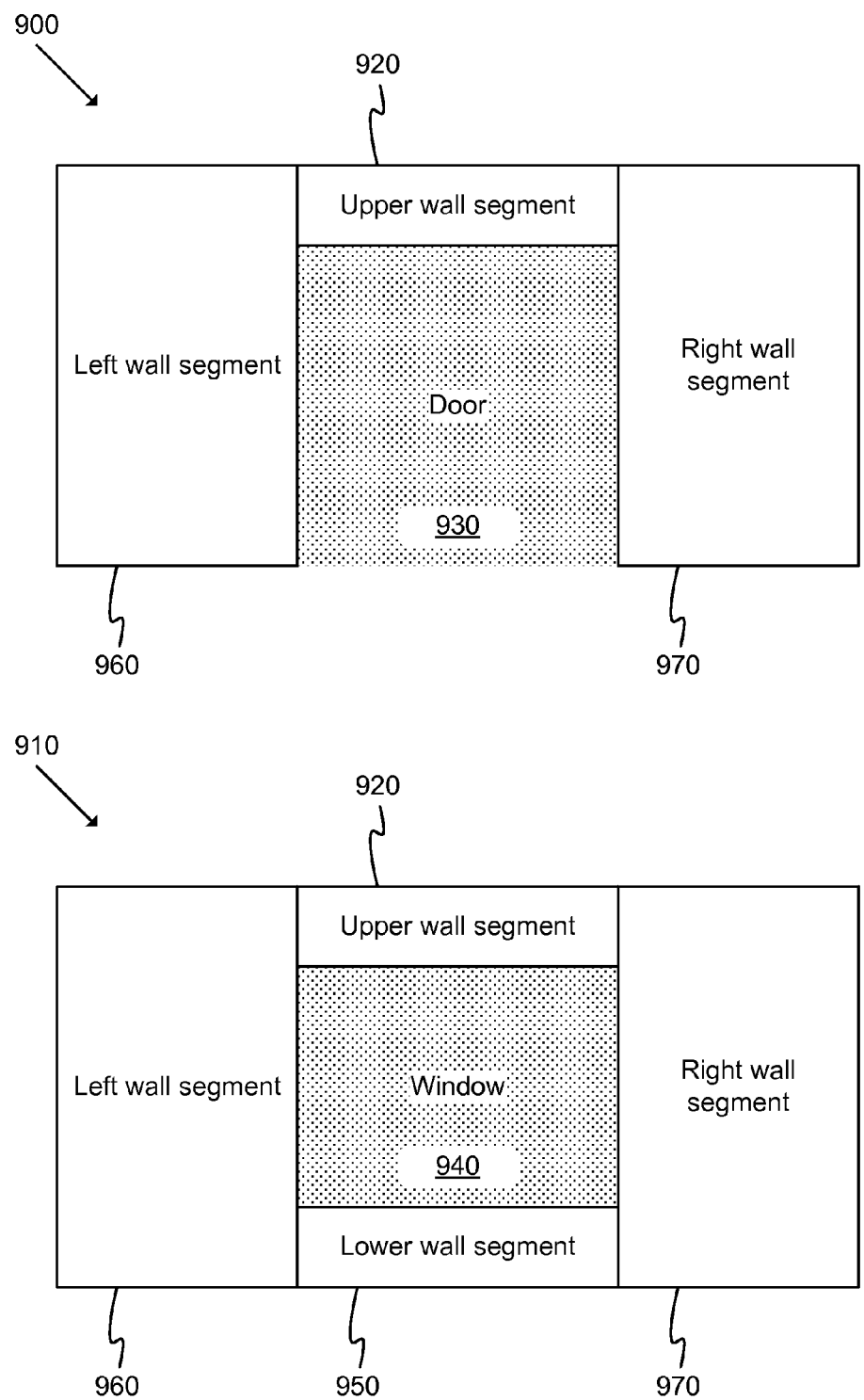
FIG. 9 illustrates conceptual UIs showing wall segments as used by some embodiments to define doors and/or windows.

FIG. 9 illustrates conceptual UIs 900 and 910 showing wall segments 920-970 as used by some embodiments to define doors and/or windows.

In this example, UI 900 includes an upper wall segment 920 and a door 930, while UI 910 includes an upper wall segment 920, a window 940, and a lower wall segment 950. Both UIs 900 and 910 in this example include a left wall segment 960 and a right wall segment 970.

Different walls may include various different numbers and arrangements of windows, doors, and/or other features, thus resulting in a different number of wall segments.

Figure 10:
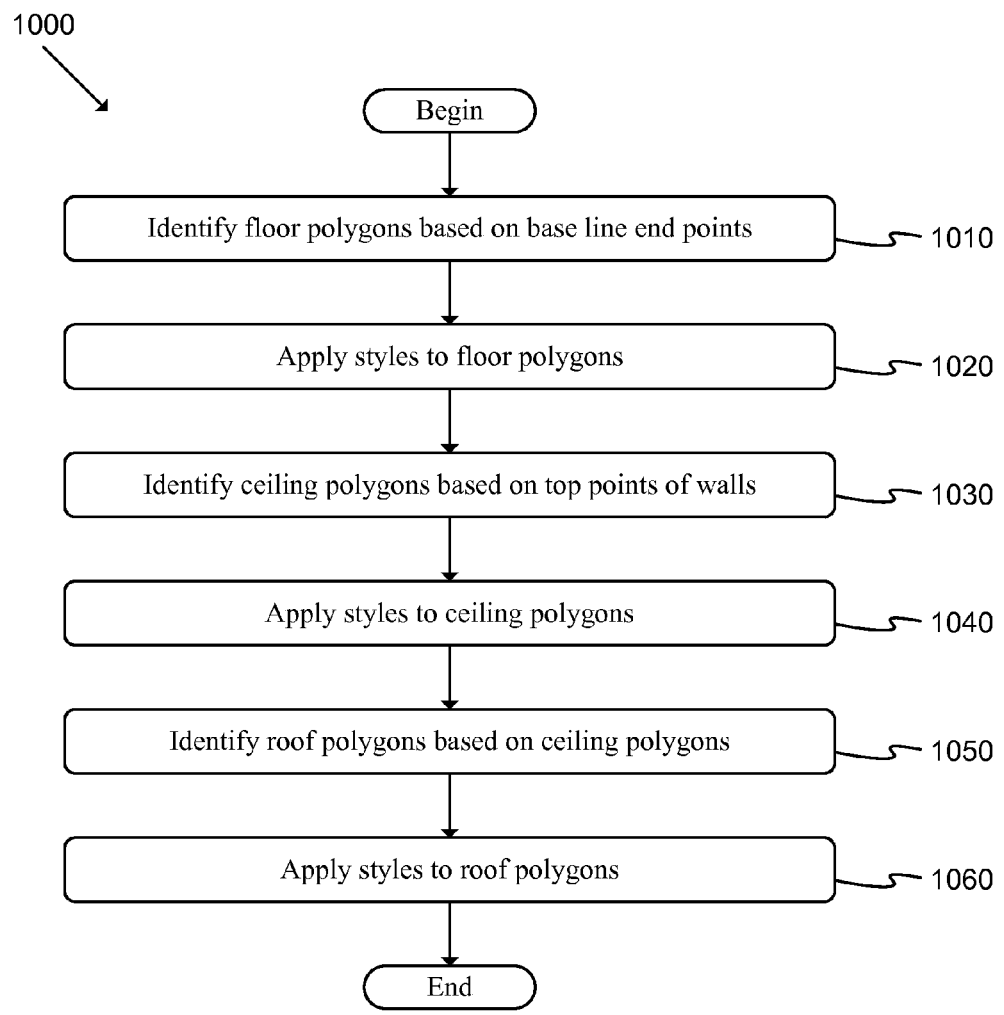
FIG. 10 illustrates a flow chart of a conceptual process used by some embodiments to render floors, ceilings, and roofs.

FIG. 10 illustrates a flow chart of a conceptual process 1000 used by some embodiments to render floors, ceilings, and roofs. Such a process may be performed to implement operations 650 and 660 described above. The process may be executed by the 3D client of some embodiments and may begin after base lines have been rendered (e.g., after completing a process such as process 700 described above).

The process may identify (at 1010) floor polygons based on the base line end points. Next, the process may apply (at 1020) styles to the floor polygons. Such styles may include, for instance, colors, graphics, multimedia, or other defining visual and audio enhancements. The process may then identify (at 1030) ceiling polygons based on the top points.

The process may then apply (at 1040) styles to the ceiling polygons. Such styles may be included in the structure definitions. The process may then identify (at 1050) roof polygons based on the ceiling polygons. Finally, the process may apply (at 1060) styles to the roof polygons and then end. Such styles may be included in the structure definitions.

D. Connecting Grids

Some embodiments may allow connections of multiple 3D building websites from any hosted website sources to virtually connect or join 3D building websites, structures, objects, areas, and/or spaces into continuous virtual communities, which can represent actual communities, shopping malls, cities, states, provinces, countries, planets, galaxies, etc. during a 3D browsing session.

Connecting grids of some embodiments may combine the 3D buildings similarly to parcels on a map for a continuous 3D browsing experience. Some embodiments provide constructs, methodologies, and/or interactions whereby connecting grids may provide maps of connected elements (e.g., buildings, virtual communities, cities, etc.) within a 3D world. Connecting grids may connect 3D building websites in any direction, such as using a three axis coordinate system. For example, in a fictional virtual city, a 3D building website may be connected vertically to hover on a cloud above another 3D building website.

Figure 11:
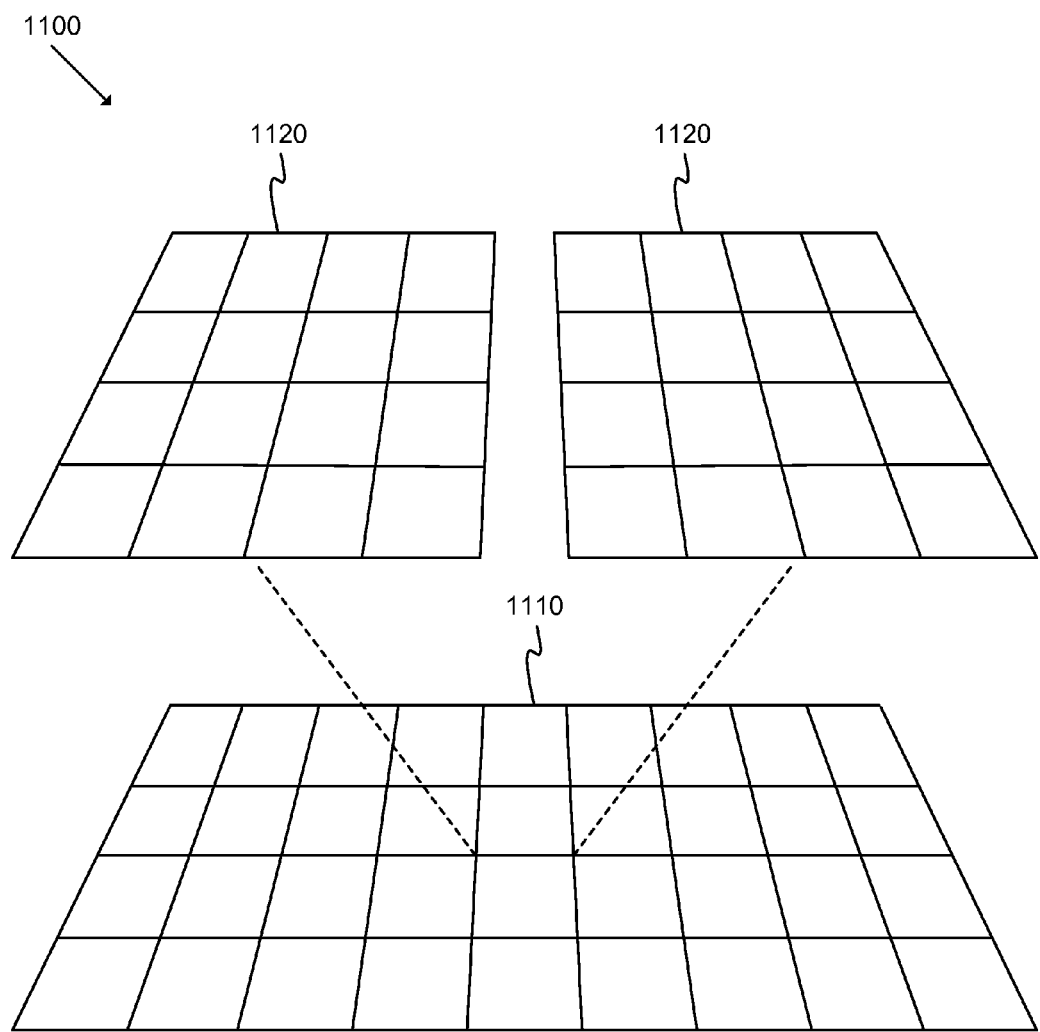
FIG. 11 illustrates a conceptual data element diagram showing multiple building grids associated with a connecting grid as used by some embodiments.

FIG. 11 illustrates a conceptual data element diagram 1100 showing multiple building grids 1120 associated with a connecting grid 1110 as used by some embodiments. Building grids maintain continuity and virtual space, which brings the continuity needed to pan and walk throughout multiple 3D websites within a virtual environment. Connecting grids may be used to bind multiple building grids and/or multiple connecting grids. Connecting grids may be used for relative location and binding in consistent directions with less concern for distance. Building grids may also be rotated to face different directions (and/or otherwise be differently arranged) on a connecting grid.

Connecting grids may allow virtual cities (and/or other communities) to be designed by associating sets of 3D buildings (or zones) on one or more connecting grid. Such virtual cities may not necessarily be exclusive. For instance, a corporate storefront may be placed within various different virtual communities, as appropriate.

In addition, different users may be presented with different virtual communities. For instance, a first user with a preference for a particular brand may be presented with a community that includes a storefront related to that brand while a second user with a preference for a different brand may be presented with a different storefront within the same community. As another example, a community within a social network may be defined at least partly based on sets of user associations (e.g., "friends" may be able to access a structure defined by a first user, but strangers may not, etc.).

E. Movement within a 3D Environment

Some embodiments allow instantaneous and/or animated movement throughout the 3D views of web content in the form of 3D structures, buildings, and/or objects. Such movement includes the ability to pan within a 3D view to provide an experience similar to standing in one location and looking in various directions from that location. Another example of such movement includes a walk action to change the grid location or view point of the virtual user to simulate movement throughout the 3D structures, buildings, and/or objects.

Although the following examples show a single building within a single zone, one of ordinary skill in the art will recognize that movements such as pan and walk may be used within a more complex environment. Such an environment may include multiple zones, multiple buildings in each zone, etc.

Figure 12:
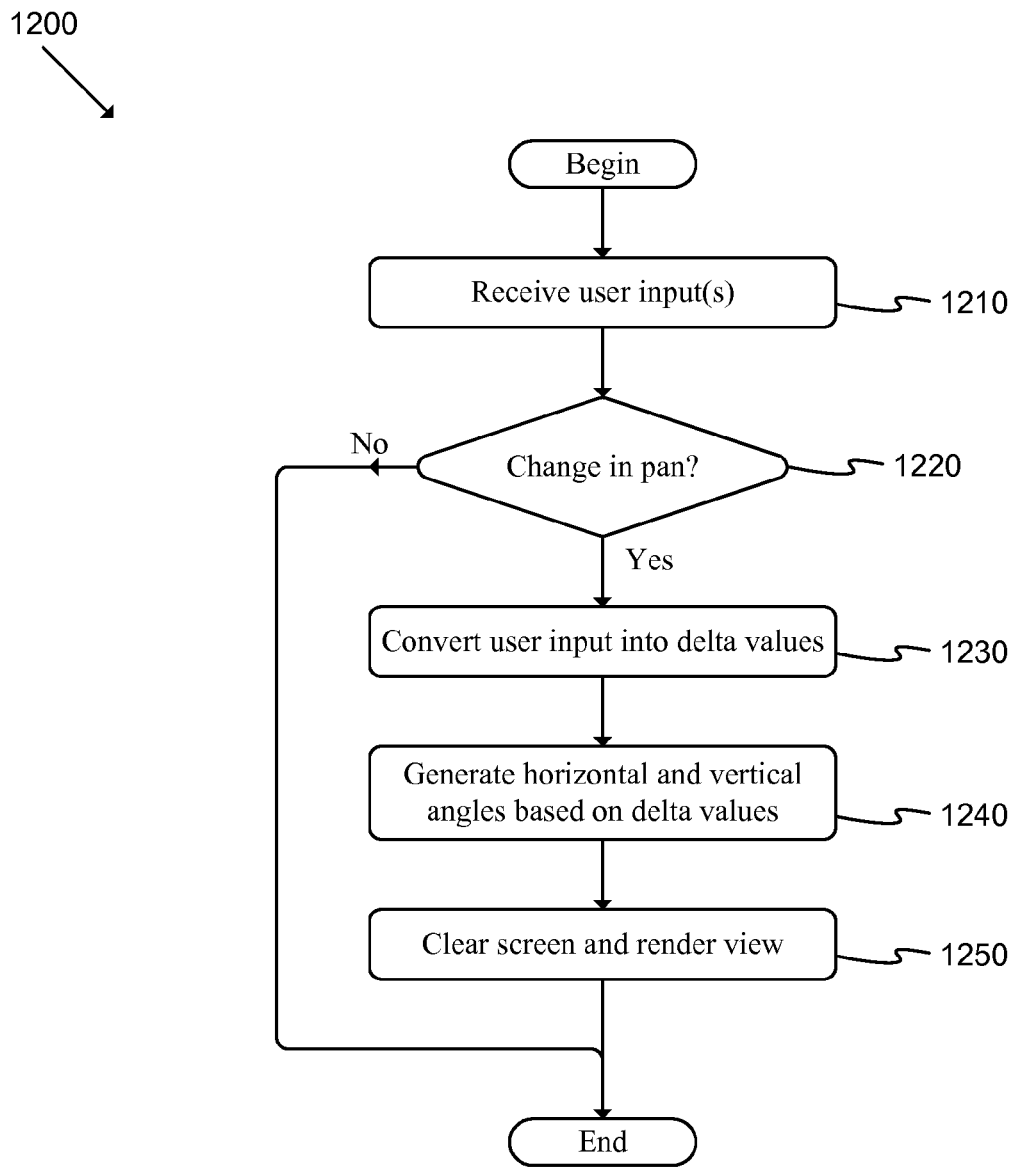
FIG. 12 illustrates a flow chart of a conceptual process used by some embodiments during a pan operation.

FIG. 12 illustrates a flow chart of a conceptual process 1200 used by some embodiments during a pan operation. Such a process may be executed by the 3D client of some embodiments and may be performed continuously during a 3D browsing session.

As shown, the process may receive (at 1210) user inputs. Such inputs may be received in various appropriate ways (e.g., via a mouse, keyboard, touchscreen, device motion, user motion, etc.). Next, the process may determine (at 1220) whether there is a change in pan (i.e., whether the view direction from a particular location has been changed). In some embodiments, a pan operation may be implemented when a user moves a cursor over the screen view, makes a selection (e.g., by performing a left mouse click operation), and proceeds to move the mouse in any direction on the screen while maintaining the selection (e.g., by holding the mouse button down). If the process determines (at 1220) that there is no change, the process may end.

If the process determines (at 1220) that there is a change in pan, the process may convert (at 1230) user inputs into delta values, generate (at 1240) horizontal and vertical angles based on the delta values, and clear (at 1250) the screen and render an updated view.

In some embodiments, an event listener identifies a user input as a change in pan. The user input may be measured and the delta change for the request may be determined based on the Screen (x, y) movement. The change in Screen (x, y) movement may then be converted into updated horizontal and vertical Angles. These angles may then be used as the new 3D rendered view process may be triggered and the pan process completes, while resetting the event listener to begin again.

During a pan operation (e.g., when a user is holding the left mouse button down), operations 1230-1250 may be continuously repeated as the user moves the cursor (e.g., via the mouse).

After clearing (at 1250) the screen and rendering the view, the process may end (e.g., when a user releases the left mouse button).

Figure 13:
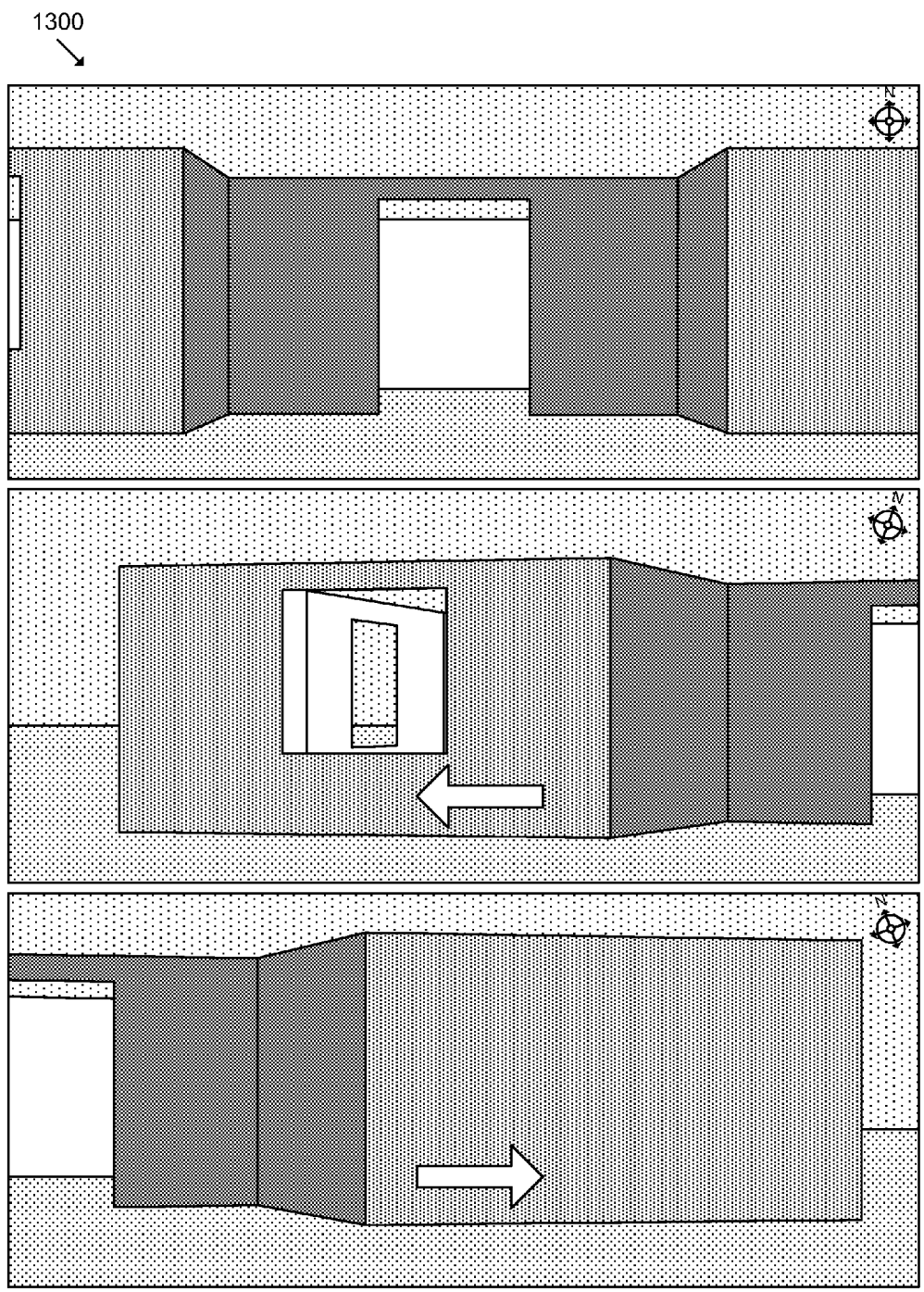
FIG. 13 illustrates a set of conceptual UIs showing a pan left operation and a pan right operation of some embodiments.

FIG. 13 illustrates a set of conceptual UIs 1300 showing a pan left operation and a pan right operation of some embodiments. Viewed from top to bottom, the first UI demonstrates a 3D building view from a vantage point centered directly in front of the building. The second UI shows a left rotation pan of the view, with the arrow representing direction of movement. The vantage point of the view has not changed. The building may be shifted incrementally towards the right side of the view providing an animated action. The third UI shows a right rotation pan of the view, with the arrow representing direction of movement.

Figure 14:
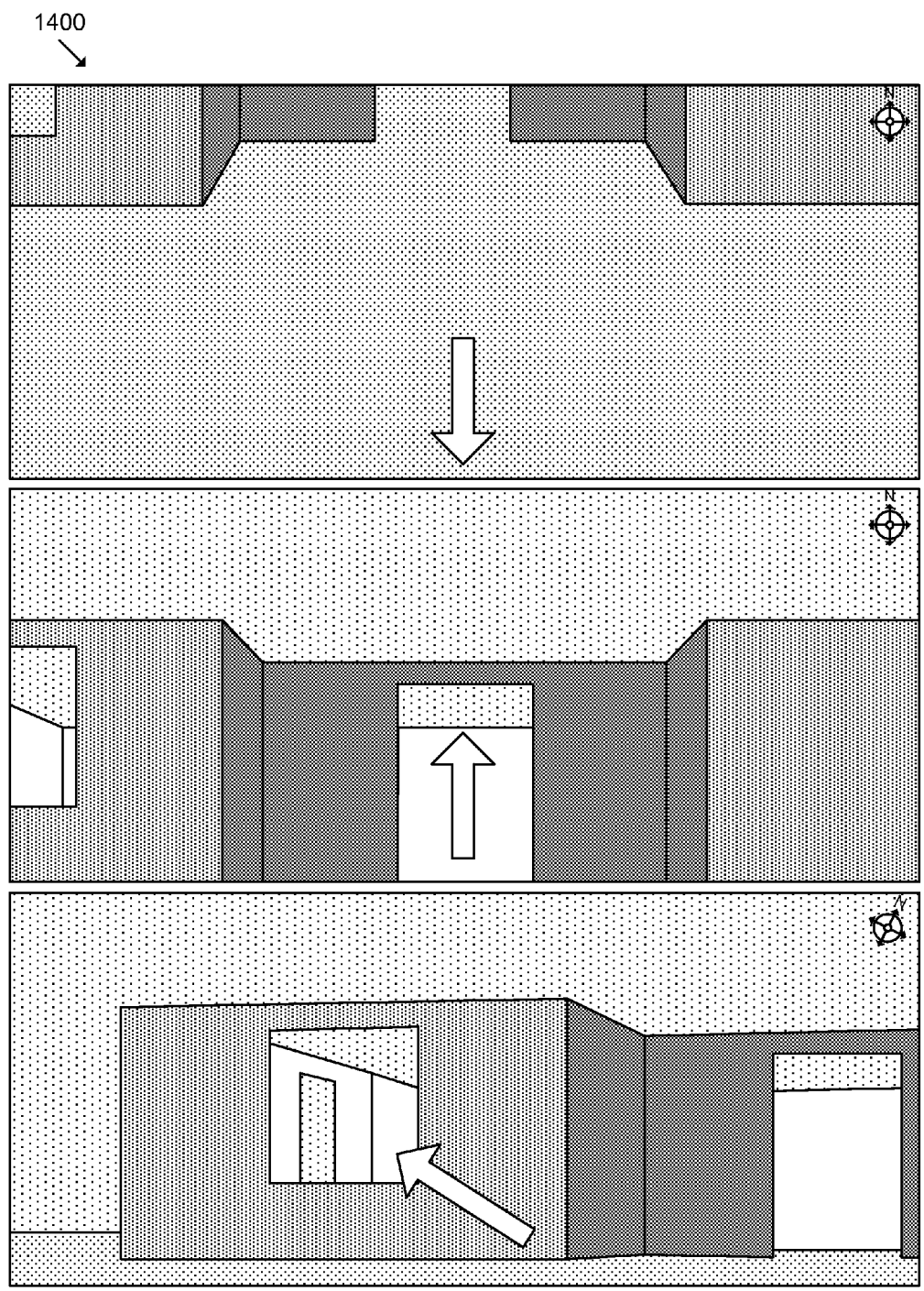
FIG. 14 illustrates a set of conceptual UIs showing a pan up, pan down, and diagonal pan operations of some embodiments.

FIG. 14 illustrates a set of conceptual UIs 1400 showing a pan up, pan down, and diagonal pan operations of some embodiments. The first UI shows a pan down, as represented by the arrow. Notice that the building is rotated up the view, revealing more of the ground in the display. The second UI shows a pan up, as represented by the arrow. The pan up operation rotates the building down in the view revealing more sky in the view. The final UI shows a multi-direction pan, as represented by the arrow. In this example, up and left panning are combined, resulting in the building shifting toward the bottom right of the view.

Figure 15:
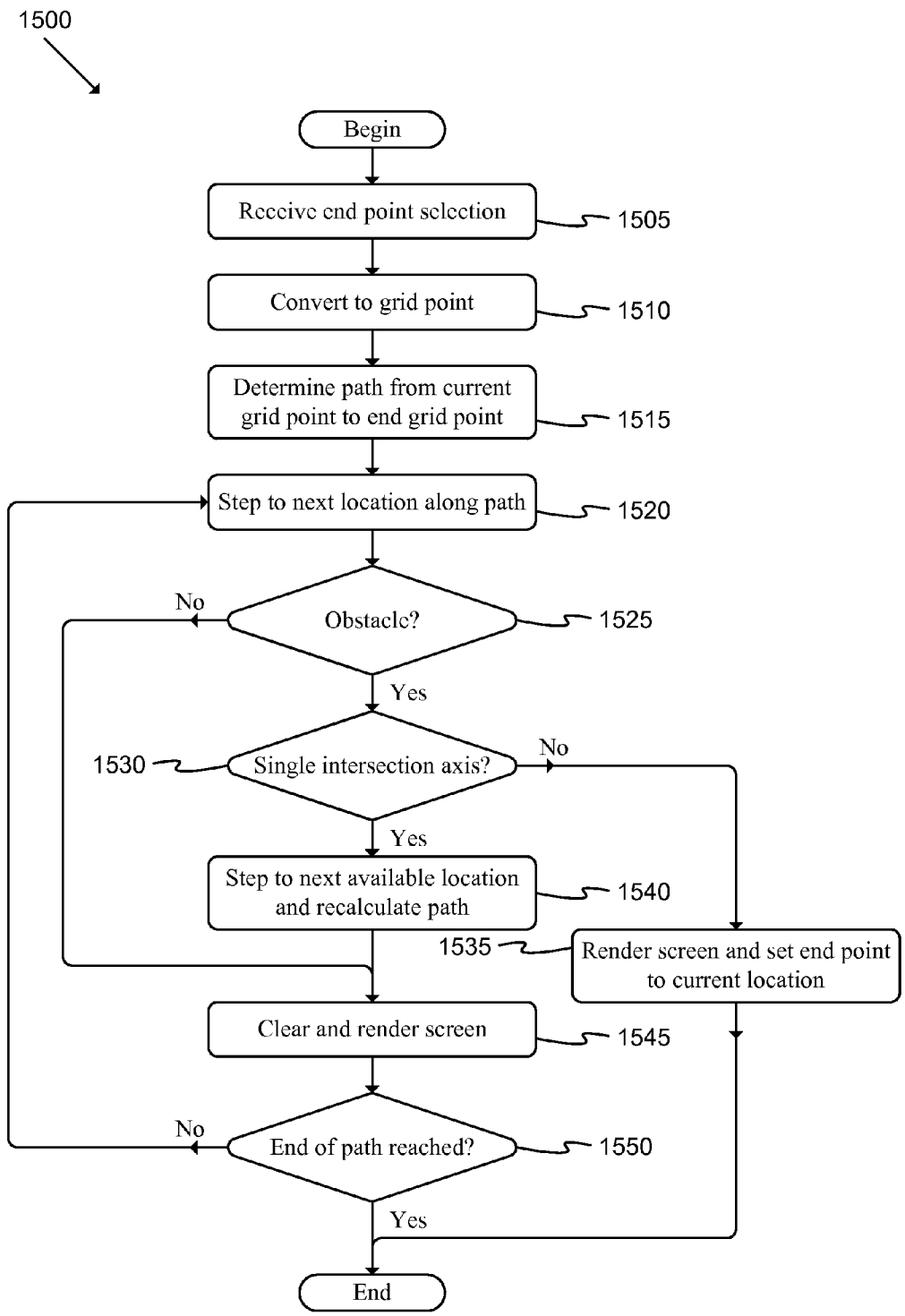
FIG. 15 illustrates a flow chart of a conceptual process used to implement movement within a UI of some embodiments.

FIG. 15 illustrates a flow chart of a conceptual process 1500 used to implement movement within a UI of some embodiments. Such a process may be performed to implement a walk operation. The process may be executed by the 3D client of some embodiments and may be performed continuously during a 3D browsing session.

As shown, the process may receive (at 1505) an end point selection. Such a selection may be made in various appropriate ways (e.g., a user may double click the left mouse button on a location on the screen view).

Next, the process may convert (at 1510) the Screen (x, y) end point selection into a Grid (x, y) point for use as a walking end point. The process may then determine (at 1515) a path from the current grid point to the end grid point. The path may be a straight line in some embodiments. The straight line path may be divided into segments and a loop of movements through the increment segments may be created to provide an animated movement effect on the screen view.

The process may then step (at 1520) to the next location along the path. The process may then determine (at 1525) whether there is an obstacle (e.g., a wall) preventing movement along the path section. If the process determines (at 1525) that there is an obstacle, the process may then determine (at 1530) whether there is a single intersection axis with the obstacle. If the process determines (at 1525) that these are multiple intersection axes (e.g., when a virtual user moves into a corner or reaches a boundary), the process may render (at 1535) the screen and set the end point to the current location and then may end.

If the process determines (at 1530) that there is a single intersection axis (e.g., when a virtual user moves along a wall), the process may then step (at 1540) to the next available location (e.g., by moving along the non-intersecting axis) and recalculate the path from the current location to the end point selection.

After stepping (at 1540) to the next available location or after determining (at 1525) that there is no obstacle, the process may clear and render (at 1545) the screen.

Next, the process may determine (at 1550) whether the end of the path has been reached. If the process determines (at 1550) that the end of the path has not been reached, the process may repeat operations 1520-1550 until the process determines (at 1550) that the end of the path has been reach and then ends.

Figure 16:
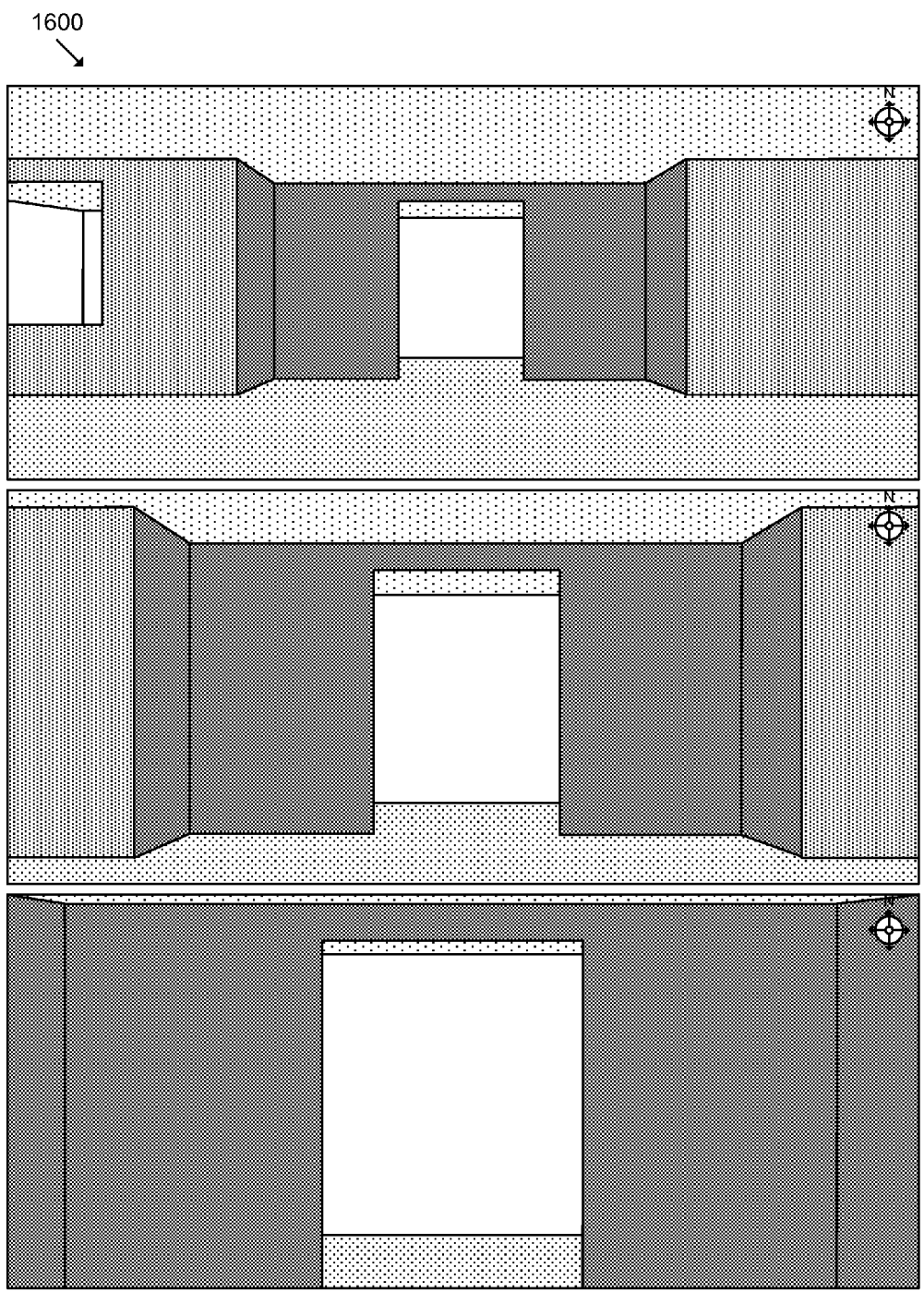
FIG. 16 illustrates a set of conceptual UIs showing a forward movement operation of some embodiments.

FIG. 16 illustrates a set of conceptual UIs 1600 showing a forward movement operation (e.g., a walk) of some embodiments. Walking the view forward moves the user's vantage point forward. In this example, toward a building. Walking the view may be triggered by user inputs made via elements such as a keyboard, mouse, or touchscreen. The building animation or incremental change may appear to make the building polygons increase in size as the vantage point moves toward the building. Viewed from top to bottom, the first UI demonstrates a view with a vantage point in front of a building. The second UI demonstrates a view with a vantage point closer to the building. The third UI demonstrates a view with a vantage point closer still to the building. The change in vantage point may be shown using incremental changes to provide an animated movement.

Figure 17:
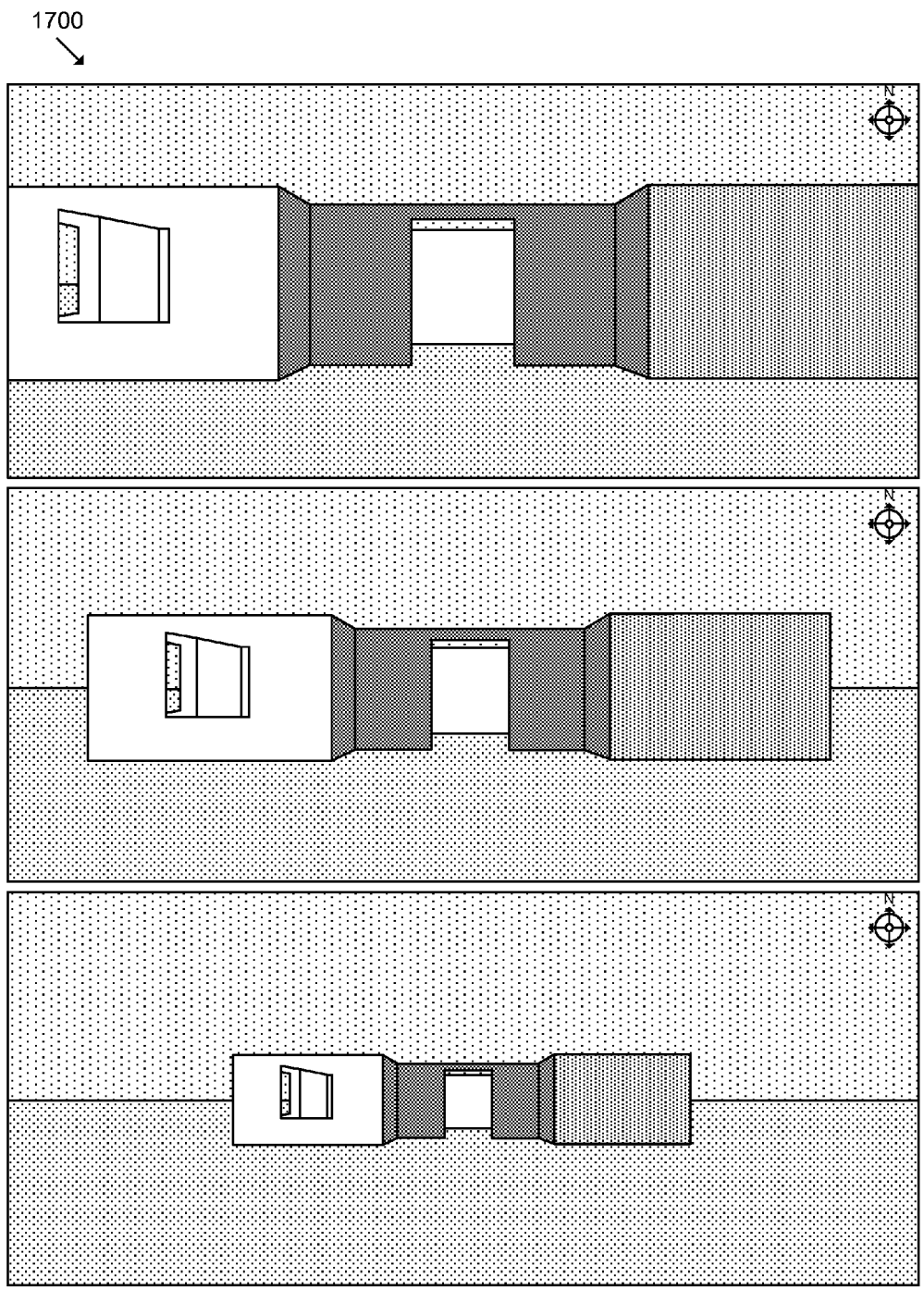
FIG. 17 illustrates a set of conceptual UIs showing a backward movement operation of some embodiments.

FIG. 17 illustrates a set of conceptual UIs 1700 showing a backward movement operation of some embodiments. Walking the view backward moves the user's vantage point backward. The vantage point may be moved away from the building and the animation of the view may show the building decreasing in size proportional to the distance of the vantage point. The first UI demonstrates a view with a vantage point in front of the building. The second UI demonstrates a view with a vantage point farther from the building. The third UI demonstrates a view with a vantage point farther still from the building. The change in vantage point may be shown using incremental changes to provide an animated movement.

Panning and/or walking operations of some embodiments may include manipulation of the displayed 3D environment to simulate changes in perspective with regard to the rendered structures and objects within the 3D environment.

While the users move throughout the 3D environment, each user may interact with multimedia, web forms, webpages, and/or other web content that is provided within the 3D environment.

F. Continuous Browsing Session

Some embodiments provide a continuous user experience by allowing the user to keep a webpage (represented by a building) alive, thus minimizing the need for a full page refresh that causes a user device view to stop or clear and load the webpage again.

Instead of using such full webpage refreshes or reloads, some embodiments utilize hidden partial webpage refreshes and web requests to feed structure definitions, objects, and/or web content to and from the 3D client as the virtual user moves in and out of a proximity limit associated with a 3D building, structure or object.

Figure 18:
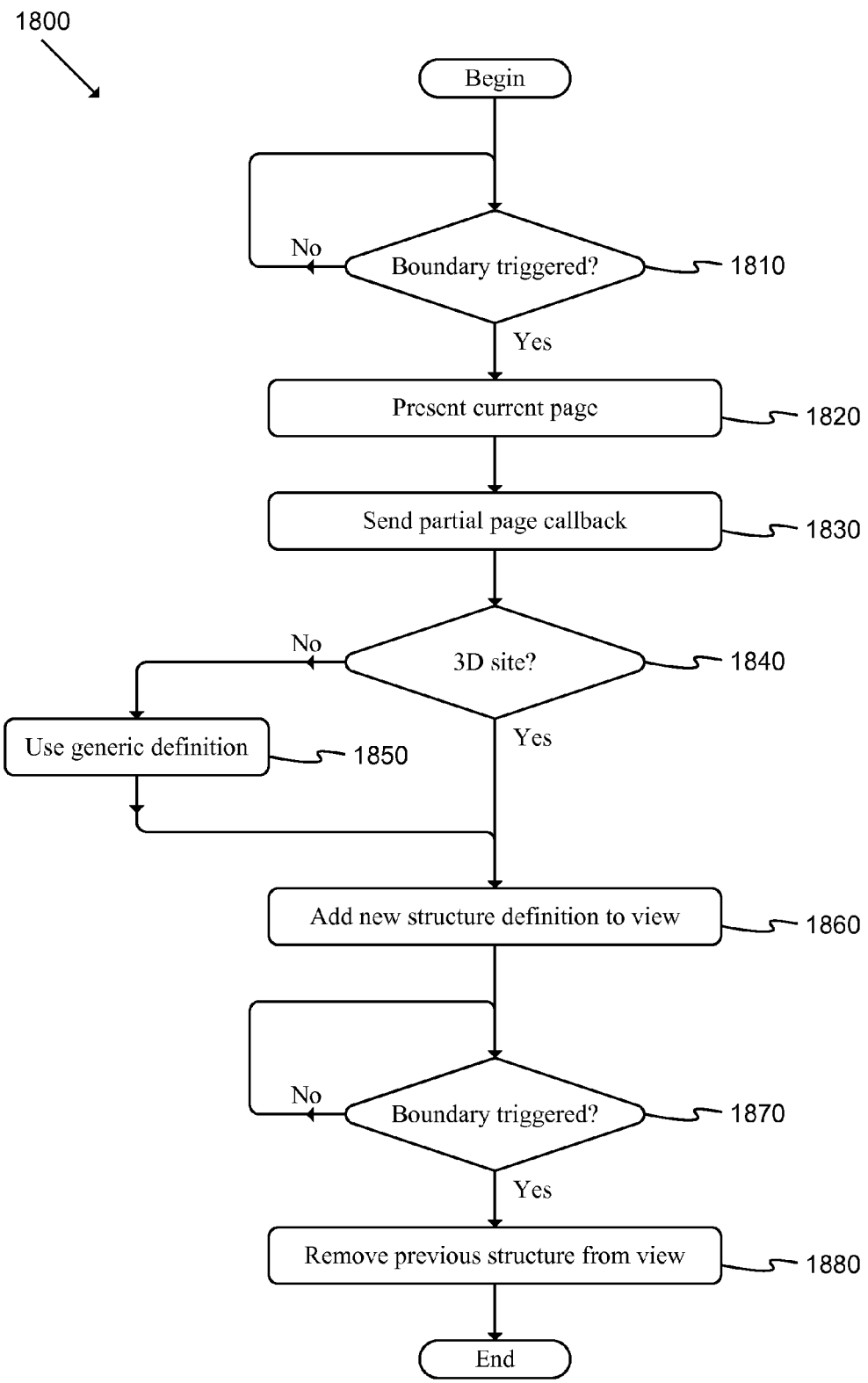
FIG. 18 illustrates a flow chart of a conceptual process used by some embodiments to provide a continuous browsing experience.

FIG. 18 illustrates a flow chart of a conceptual process 1800 used by some embodiments to provide a continuous browsing experience. The process may begin, for instance, when a 3D browsing session is launched (e.g., when a user navigates to a URL associated with a website having 3D content). The web server hosting the 3D building website may transfer the 3D client and structure definitions related to the requested website. Alternatively, the 3D Client may be included in the browser itself (or other appropriate application). Some embodiments may allow a user to disable or enable the 3D client during browsing.

The 3D client of some embodiments may provide input event listeners, send client activity traces back to the hosting system, provide output rendering code used to interpret the various objects and structure definitions, provide view manipulation code which creates the animated views such as pan and walk, and provide the code to display design grids and maps.

After loading, the 3D client typically interprets the structure definitions and objects and renders the 3D View. The 3D client may then utilize event listeners to detect user inputs such as mouse movements, mouse clicks, touch screen gestures, and/or motion detectors to trigger processes for pan and walk.

Operations such as pan and walk may cause movement of the virtual user. The position of the virtual user may be compared to grid coordinates representing, for instance, other structures, doors, and/or windows (and any associated boundaries).

Process 1800 may determine (at 1810) whether a boundary was triggered by a user movement (and/or other appropriate criteria are met). If the process determines (at 1810) that no boundary was triggered, the process may continue to repeat operation 1810 until the process determines (at 1810) that a boundary was triggered.

If the process determines (at 1810) that a boundary was triggered, the process may continue to present (at 1820) the current page, with movement if appropriate. Next, the process may send (at 1830) a partial page callback to a new URL. In this way, the 3D client may be able to stay active throughout the process of loading additional structures and objects. In some embodiments, the server may respond to the callback with a set of structure definitions.

Next, the process determines (at 1840) whether the new URL has returned a 3D site. If the process determines (at 1840) that the returned site is not 3D, the process may use (at 1850) generic definitions. A standard website may be interpreted and displayed as a generic 3D structure as shown in FIG. 2 in order to provide a 3D viewing experience that is not disjointed After using (at 1850) the generic definitions or after determining (at 1840) that the returned site is 3D, the process may add (at 1860) the new structure definition(s) to the view.

Process 1800 may then determine (at 1870) whether a boundary has been triggered (and/or other appropriate criteria are met). Such a boundary may be associated with, for instance, a window, door, stairs, room, etc. If the process determines (at 1870) that no boundary has been triggered, the process may repeat operation 1870 until the process determines (at 1870) that a boundary has been triggered. The process may then remove (at 1880) previous, unneeded structure(s) and/or other elements from the view. Such elements may be removed based on various appropriate criteria (e.g., virtual distance from the virtual user, number of boundaries between the current position of the virtual user and the element(s) to be removed, etc.).

In this way, any element that is no longer required may be removed as part of a memory management process to assist in retaining smooth animation.

With traditional websites, a website may only be viewed if the user enters the exact URL in the browser, if the URL is returned by a search engine or other resource, or the URL is linked from another traditional webpage. The traditional method of viewing websites leaves significant amounts of web content essentially undiscoverable. By using connecting grids, virtual communities and cities may be created where users are able to pan and walk to discover new website structures.

Some embodiments may allow users to explore or browse web content without the requirement of search key words or the like. Traditionally, a user may perform a search and then click various hyperlinks on webpages to transverse the Internet. Such an approach may limit a user's ability to discover content. Thus, some embodiments allow grouped structures representing virtual planets, continents, countries, states, provinces, cities, communities, and/or other groupings. Users may transition between structures and discover structures and web content that are not directly related to a search query.

Figure 19:
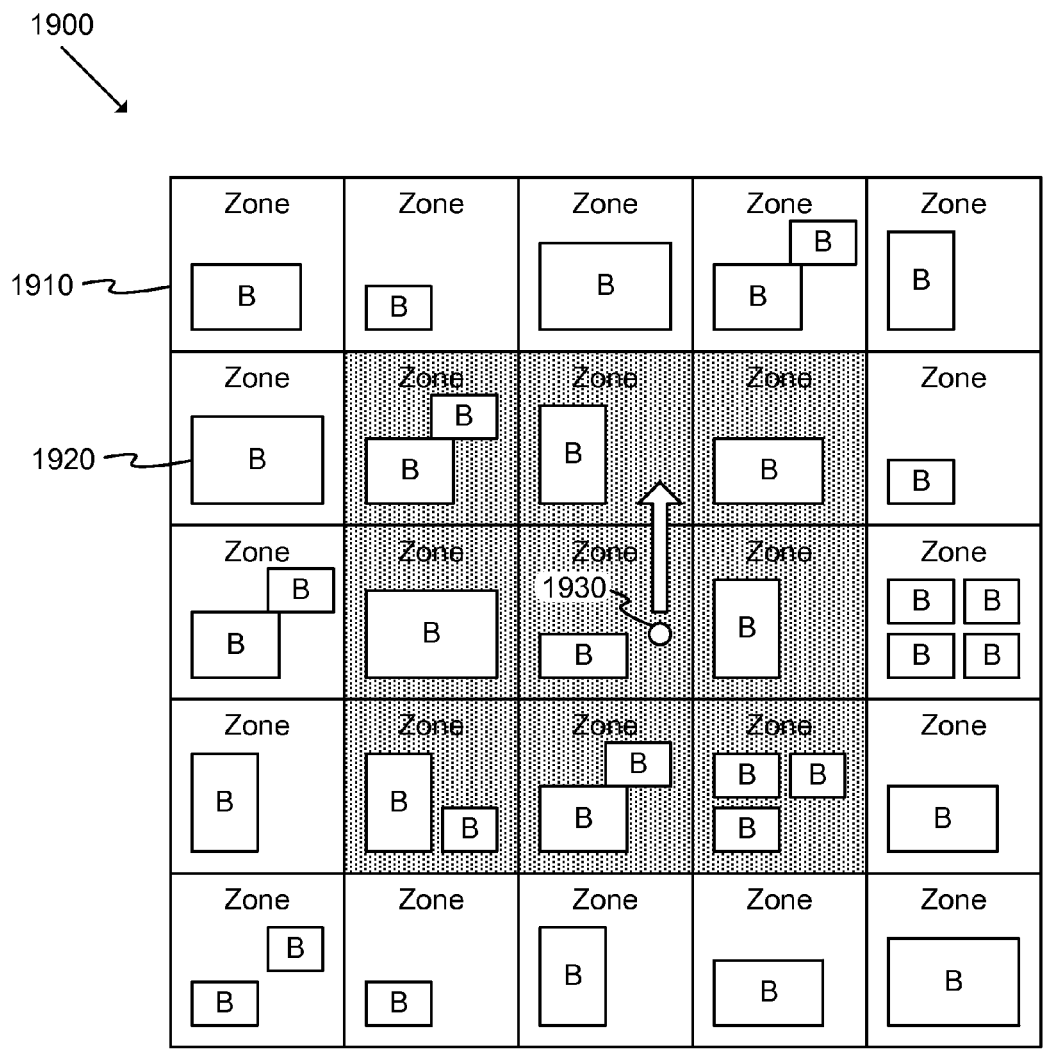
FIGS. 19-20 illustrate a conceptual layout of a set of websites based on a connecting grid and show user movement within the layout.
Figure 20:
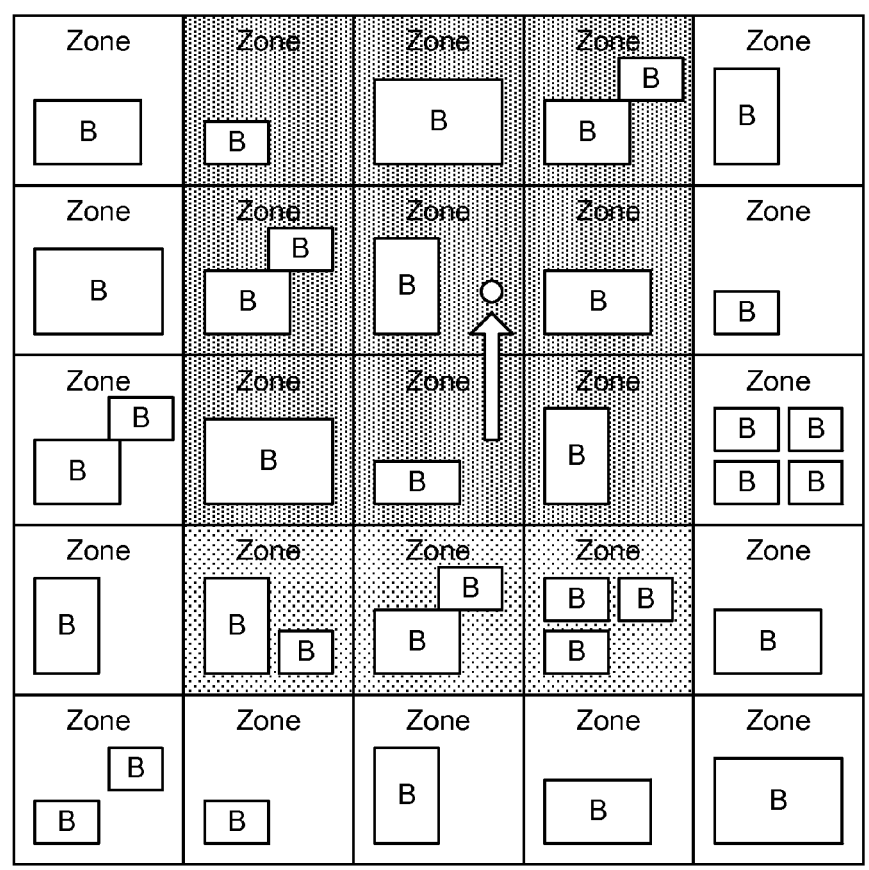

In some embodiments, the operations associated with a process such as process 1800 may be implemented using zones, where each zone may include a set of structures. FIGS. 19-20 illustrate a conceptual layout of a set of websites based on a connecting grid 1900 and show user movement within the layout. As shown, the connecting grid 1900 may include a number of zones 1910, where each zone may include a set of buildings 3020.

As described above, each zone may have an anchor (lower left corner in this example) that is used to associate the zones 1910 to each other. Although the zones are represented as equally sized rectangles in this example, each zone may be a different size (or the size may change) depending on factors such as building layout, user preferences, etc., with the zones aligned using the anchor. In addition, different embodiments may include zones of different shape, type, etc.

As shown, in the example of FIG. 19, a user 1930 is located in a particular zone (with a particular pan view angle), and all surrounding zones (indicated by a different fill pattern) may be loaded (and viewable) based on the user's position (and/or view). The particular zone may be associated with, for instance, a particular URL entered by the user. The site associated with the URL may specify the particular zone and the user's starting position and/or orientation.

Different embodiments may load a different number or range of surrounding zones that may be defined in various different ways (e.g., connecting grid distance, radius from current position, etc.). The size of the surrounding zone may vary depending on factors such as user preference, computing capability, etc. In some embodiments, the connecting grid may specify sets of zones (and/or surrounding zone range) associated with particular locations throughout the grid. Thus, the surrounding area may be several orders of magnitude greater than the example of FIG. 19.

Some embodiments may retrieve connecting grid definitions upon loading of the particular URL, where the connecting grid defines the relative position of a set of websites (each identified by URL) in relation to each other.

As the user 1930 moves to another position (and associated zone 1910) as shown in FIG. 20, several zones 1910 are added to the surrounding zone area (i.e., the currently viewable elements of the 3D environment 1900), as shown by a first fill pattern. In addition, several zones 1910 are removed from the surrounding area, as shown by a second fill pattern. Such updates to the currently loaded surrounding zones may be implemented using a process such as process 1800.

In this way, a user may be presented with an interactive navigable region that is seamlessly updated as the user moves throughout the environment. When the surrounding zone is made large enough, a user perception may be similar to a physical environment where structures shrink and fade into the horizon (or appear at the horizon and grow) as the user moves about the environment. In this way, a user may be presented with a virtually endless environment.

G. Virtual User Location

Some embodiments may track the grid location and viewing characteristics of virtual users within 3D building websites and/or connecting grids in order to provide a way of binding the URL (or equivalent) to a specific location, angle of viewing, and/or other viewing characteristics. The location information may be provided by a combination of connecting grid coordinates, building grid coordinates, room grid coordinates, and/or user position data utilized by the 3D client when producing the 3D rendered view. The location information may be used as a 3D browsing session starting point, as a snapshot or bookmark for locations, to track usage statistics, to track movement from one domain to another, and/or render other users and/or avatars or movable objects within the user's 3D rendered view, based on real-time data.

Figure 21:
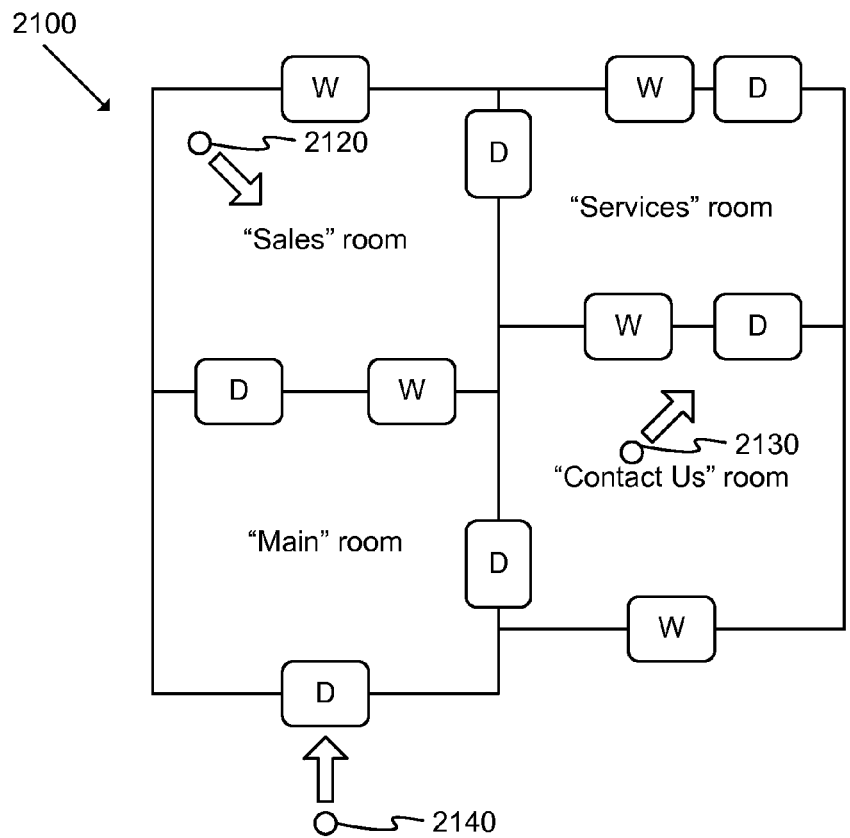
FIG. 21 illustrates a schematic block diagram of 3D buildings showing mapping of URLs to virtual locations as performed by some embodiments.
Figure 21:
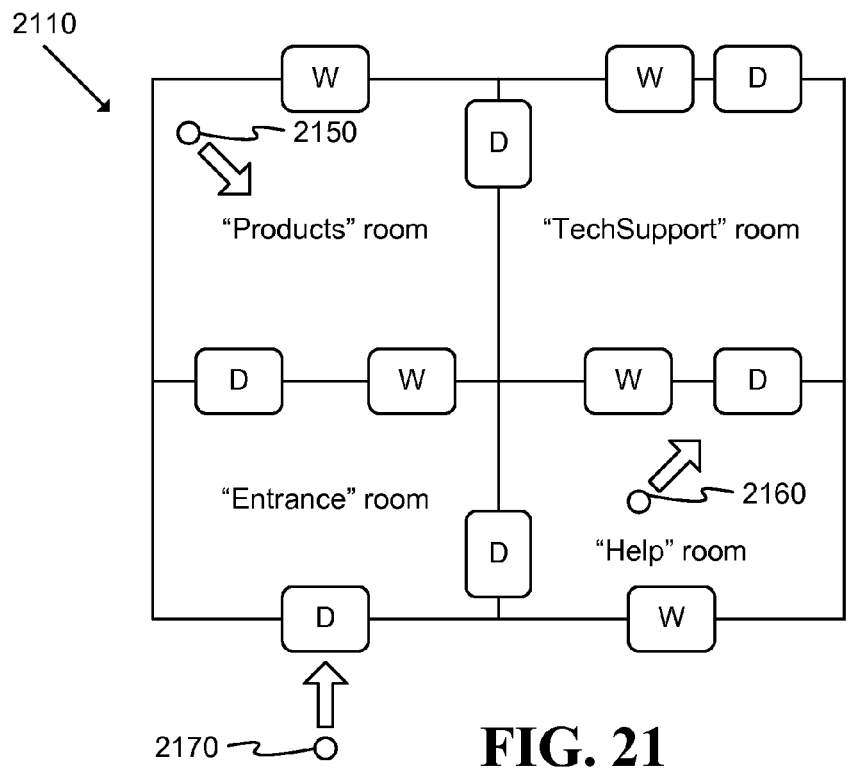

FIG. 21 illustrates a schematic block diagram of buildings 2100-2110 showing mapping of URLs to virtual locations as performed by some embodiments. The building websites 2100-2110 may be adjoining and may be associated with a connecting grid. The grid may be divided by a horizontal line to include two rectangular regions.

In this example, the region on the top (associated with building 2100) may be identified as the domain for "<corp-name>.com" and any location within this region may fall under a URL root of, for example, http://3d.<corp-name>.com or https://3d.<corp-name>.com for secure transfers of web data. The region on the bottom (associated with building 2110) may be identified as the domain for "<biz-name>.com" with a root of, for example, http://3d.<biz-name>.com or https://3d.<biz-name>.com. Regions are not limited to any particular size or shape.

Using graphing coordinate pairs any position within a region may be described using an x-y coordinate system. A computer screen generally calculates coordinates based on the origin point (0, 0) at the top left of the screen. The x-coordinate value increases positively as the point moves right, while the y-coordinate value increases positively as the point moves down. The same origin matrixes and direction of values may be used within each region. Each region may have its own point of origin for the associated coordinate system. The coordinates of a point within a region may be independent of any room, wall, structure, or object. Such coordinates may be appended to a URL in order to provide location information. In addition, a URL may include information related to rooms, walls, structures, objects, etc.

As one example, a first point 2120 may be associated with a URL such as http://3d.<corp-name>.com/Default.aspx?x=50&y=50. As another example, the same first point may include room information and be associated with a URL such as http://3d.<corp-name>.com/Sales/Default.aspx?x=50&y=50.

If the coordinates are not included in the URL, the room name may assist in identifying a starting point. For example, the URL http://3d.<corp-name>.com/Sales/ may be associated with a location in the center of the "Sales" room of building 2100.

In some embodiments, additional parameters such as view angle may be supplied in the URL to provide the initial facing direction. The angle may be based on a compass style direction, where straight up may correspond to zero degrees with the angle increasing as the facing direction rotates clockwise.

To continue the example of FIG. 21, the first point 2120 may be associated with a URL such as http://3 d.<corp-name>.com/Sales/Default.aspx?x=50&y=50&angle=135 or http://3 d.<corp-name>.com/Default.aspx?x=50&y=50&angle=135.

The second point 2130 may be associated with a URL such as http://3d.<corp-name>.com/ContactUs/Default.aspx?x=150&y=150&angle=45 or http://3d.<corp-name>.com/Default.aspx?x=150&y=150&angle=45.

The third point 2140 may be associated with a URL such as http://3d.<corp-name>.com/Default.aspx?x=75 &y=325 & angle=0.

The fourth point 2150 may be associated with a URL such as http://3d.<biz-name>.com/Products/Default.aspx?x=50&y=50& angle=135 or http://3d.<biz-name>.com/Default.aspx?x=50&y=50&angle=135.

The fifth point 2160 may be associated with a URL such as http://3d.<biz-name>.com/Help/Default.aspx?x=150&y=150&angle=45 or http://3d.<biz-name>.com/Default.aspx?x=150&y=150&angle=45.

The sixth point 2170 may be associated with a URL such as http://3d.<biz-name>.com/Default.aspx?x=75&y=300&angle=0.

H. User Interaction

Some embodiments allow users to interact with objects, multimedia, and hyperlinks on 3D structures, buildings, rooms, walls, objects, and/or other elements. Such interaction may allow users to interact with content provided by traditional websites. Some embodiments may utilize web components such as hyperlinks, buttons, input controls, text, images, forms, multimedia, and lists with or without programmed User interaction responses. These web components may be integrated onto walls, geometric planes, and/or other features of 3D elements and/or implemented as traditional webpages that may encompass all or part of the user's viewable screen.

Figure 22:
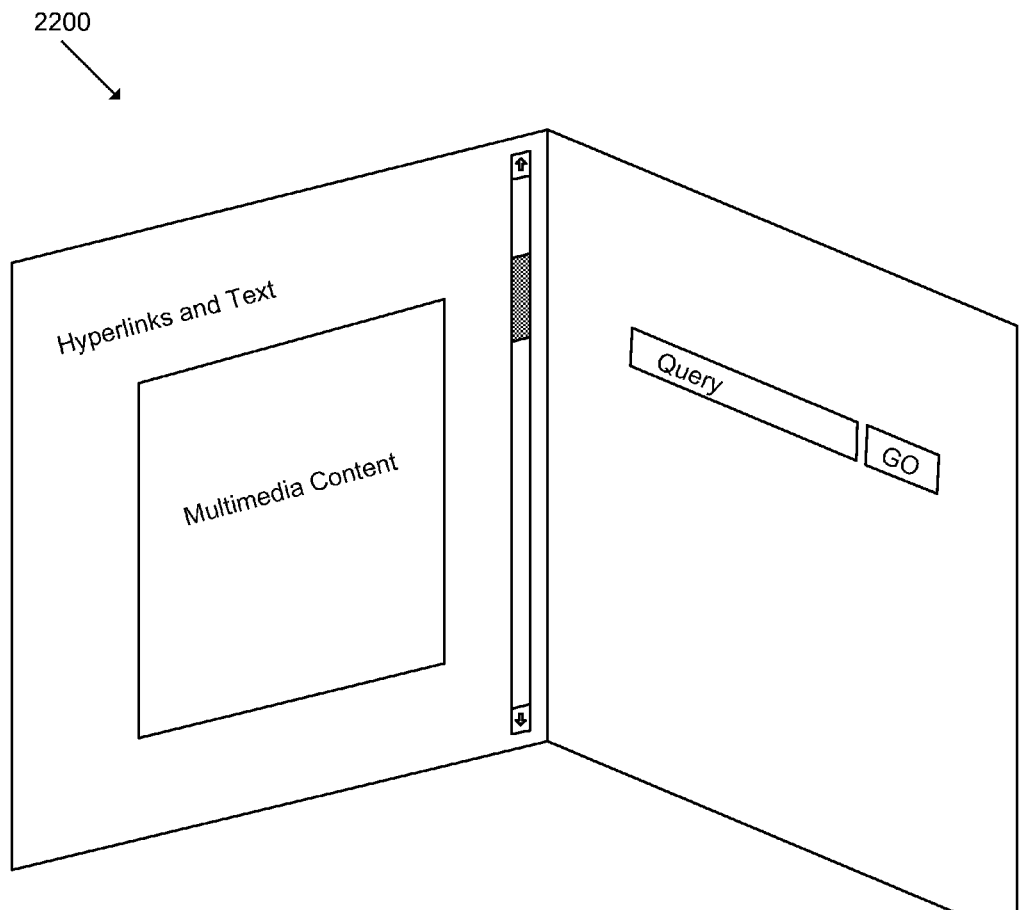
FIG. 22 illustrates a conceptual UI showing web content as displayed on structure walls of some embodiments.

FIG. 22 illustrates a conceptual UI 2200 showing web content as displayed on structure walls of some embodiments. Selection of hyperlinks may change the content on the wall to simulate opening a new webpage during a traditional browsing session.

Multimedia content such as images and video clips may also be displayed on walls. Such displayed content may be held proportional to the width of the viewable wall as the angle of view changes due to user movement. The top and bottom of the content may be displayed in proportion to the top and bottom of the wall respectively during any change in view perspective.

Web forms and components of web forms may also be simulated on perspective walls of 3D buildings. Users may use any available elements such as text boxes, selection checkboxes, radio buttons, and/or selection buttons.

Traditional webpages may use scroll bars to allow content that may be larger than the viewable area by providing a way to move the content up-down or side-to-side. In a 3D browsing session, scroll bars may be provided. Such scroll bars may be maintained in a consistent relationship with the angle of the wall in proper perspective.

I. Initiating a Browsing Session

Figure 23:
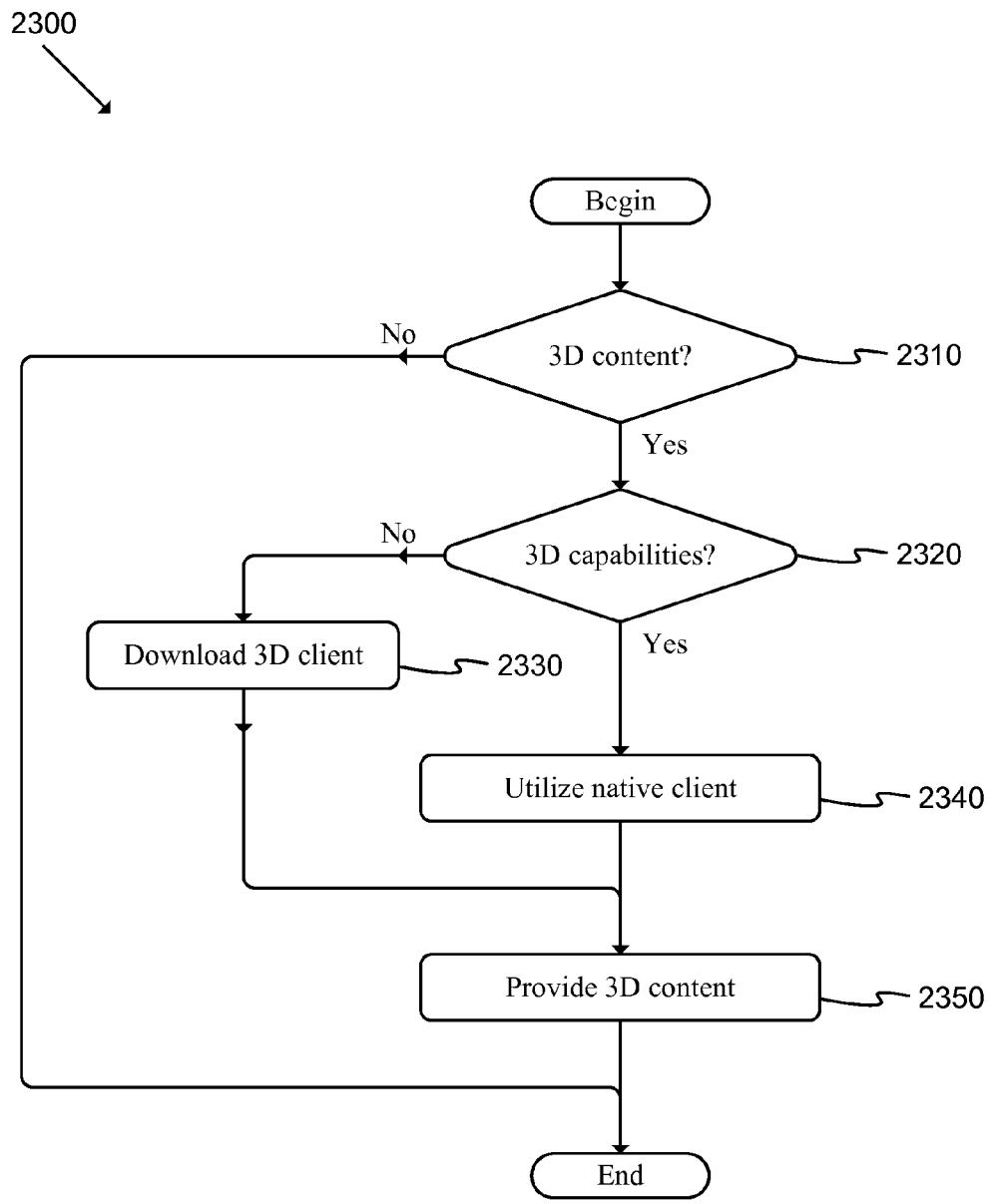
FIG. 23 illustrates a flow chart of a conceptual process used to initiate the 3D client of some embodiments.

FIG. 23 illustrates a flow chart of a conceptual process 2300 used to initiate the 3D client of some embodiments. Such a process may begin, for instance, when a user launches a browser or other appropriate application.

As shown, the process may determine (at 2310) whether 3D content has been accessed. If the process determines (at 2310) that 3D content has not been accessed, the process may end. If the process determines (at 2310) that 3D content has been accessed (e.g., when a user selects a hyperlink associated with a 3D site), the process may determine (at 2320) whether the browser or application has 3D capabilities.

If the process determines (at 2320) that the browser does not have 3D capabilities, the process may then download (at 2330) a 3D client. For the downloadable 3D client, the code may reside on a server and may be transferred to the client browser.

If the process determines (at 2320) that the browser does have 3D capabilities, the process may utilize (at 2340) a native client (e.g., by sending a request to the browser or native client). For browsers, the 3D client may render the views to an HTML5 canvas object or equivalent, whereas applications may render the views directly to the display screens.

After downloading (at 2330) the 3D client or utilizing (at 2340) the native client, the process may provide (at 2350) 3D content and then end.

J. Presenting Traditional Web Content as 3D Content

Some embodiments generate 3D rendered views of traditional web content. Such traditional websites may be interpreted by the 3D client of some embodiments to generate generic 3D structures, buildings, rooms, objects, and/or other elements. In addition, some embodiments may populate other 3D elements based on hyperlinks or other appropriate content from the traditional website. Such elements may appear as neighboring 3D buildings, structures, rooms, and objects.

Figure 24:
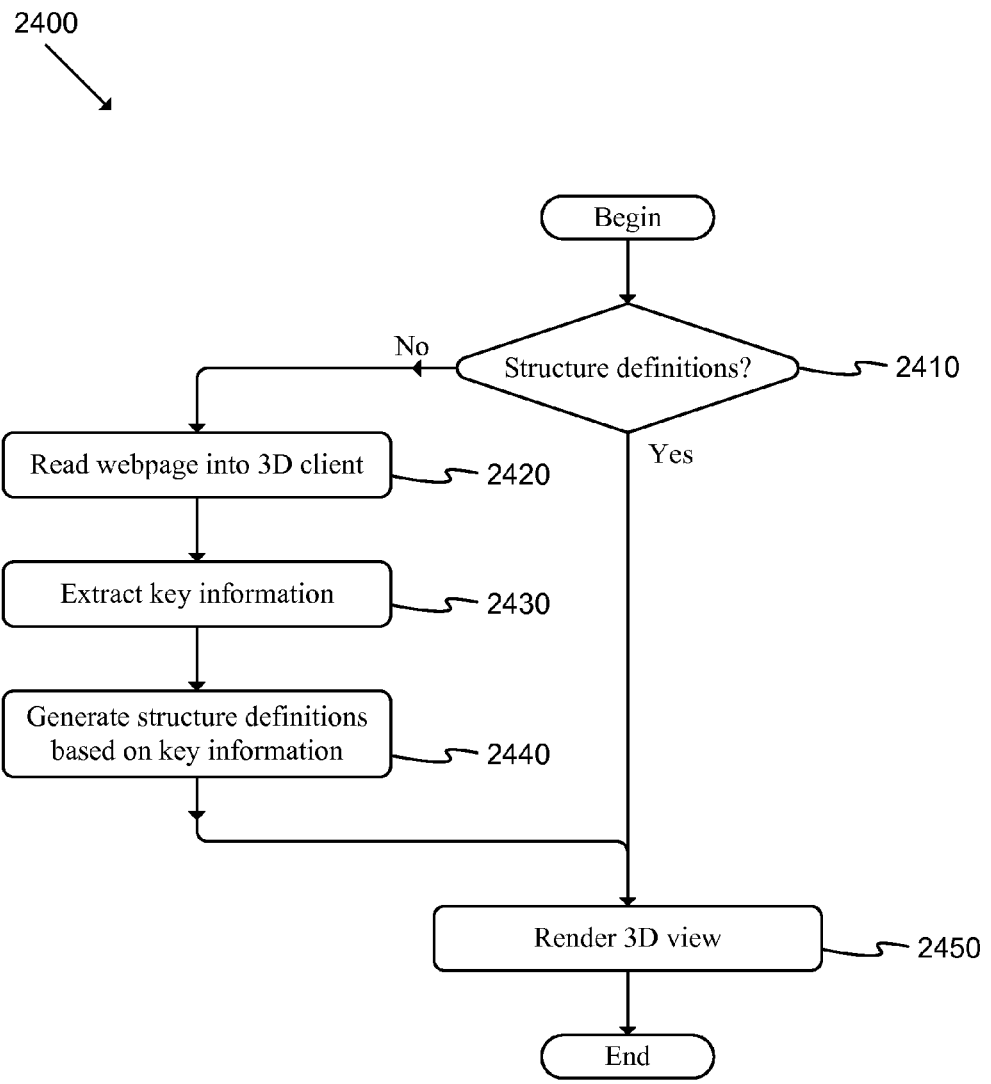
FIG. 24 illustrates a flow chart of a conceptual process used by some embodiments to process requests related to 3D or traditional webpages.

FIG. 24 illustrates a flow chart of a conceptual process 2400 used by some embodiments to process requests related to 3D or traditional webpages. Such a process may begin, for instance, the 3D client calls for and retrieves a webpage. The process may determine (at 2410) whether the retrieved webpage includes structure definitions.

If the process determines (at 2410) that the webpage does not include structure definitions, the process may read (at 2420) the webpage into the 3D client, extract (at 2430) key information, and generate (at 2440) structure definitions based on the key information.

If the process determines (at 2410) that the webpage does not include structure definitions, or after generating (at 2440) structure definitions, the process may render (at 2450) the 3D view and then end.

Figure 25:
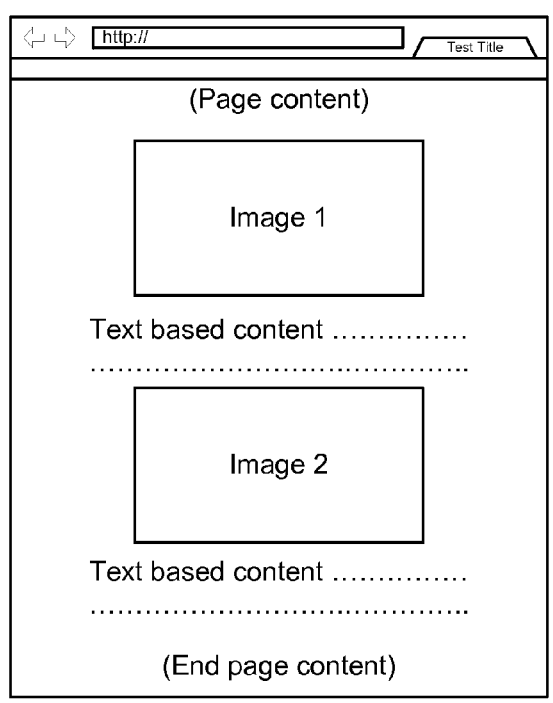
FIG. 25 illustrates a set of conceptual UIs showing a traditional webpage and a 3D version of the same content as provided by some embodiments.
Figure 25:
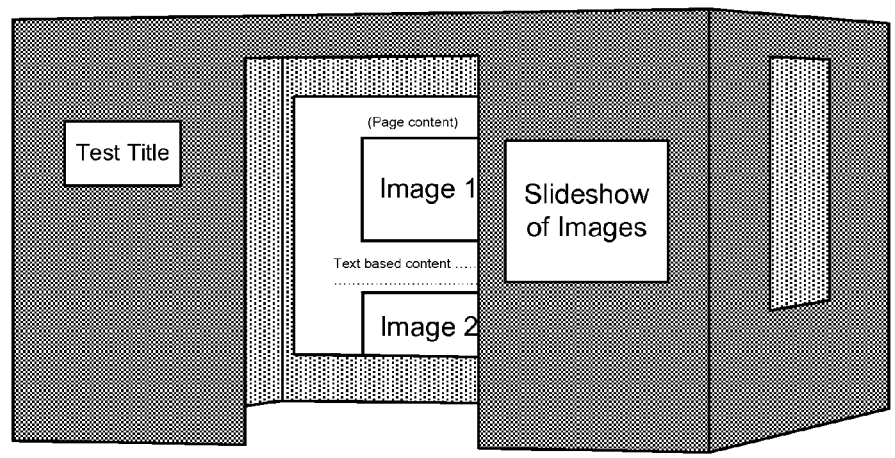

FIG. 25 illustrates a set of conceptual UIs 2500 and 2550 showing a traditional webpage and a 3D version of the same content as provided by some embodiments. In this example, parts of a webpage are pulled to create a generic 3D rendered view of a structure.

For instance, the traditional web page 2500 shows the title at a top tab of the browser while on the 3D view 2550 the title appears on the face of the building. As another example, the body style may be used as the decoration on the outside of the building. The traditional webpage white sheet area may be rendered to an internal wall. Images not deemed as design or background may be provided as a slideshow presentation on the face of the building. In addition, the traditional webpage itself may be shown on a back wall of the structure as a scrollable panel.

The example of FIG. 25 may be based on HTML code as provided below:

```
<html>
  <head>
    <title>Test Title</title>
  </head>
  <bodystyle="background-color:#CCCCCC;">
    <div style="background-color: #FFFFFF; padding:100px;">
    (Page Content)
    <img src="/images/test1.jpg" alt="Test 1"/>
    <br />Content Text<br />
    <img src="/images/test2.jpg" alt="Test 2"/>
    <br />Content Text<br />
    <img src="/images/test3.jpg" alt="Test 3"/>
    <br />Content Text<br />
    (End Page Content)
    </div>
  </body>
</html>
```

K. Accommodating Traditional Webpages During a 3D Browsing Session

Some embodiments provide compatibility with traditional webpage views by, for instance, offering framed views or switching to views of traditional webpages that may be opened by hyperlinks, buttons, and/or other browser trigger events on 3D structures, buildings, rooms, objects, walls, floors, ceilings, and/or any other geometric planes. The frames or segments may accommodate any percentage and orientation for width and height desired of the viewable browser window. Once opened within the 3D browsing session, the traditional webpage may function like any other traditional webpage.

Figure 26:
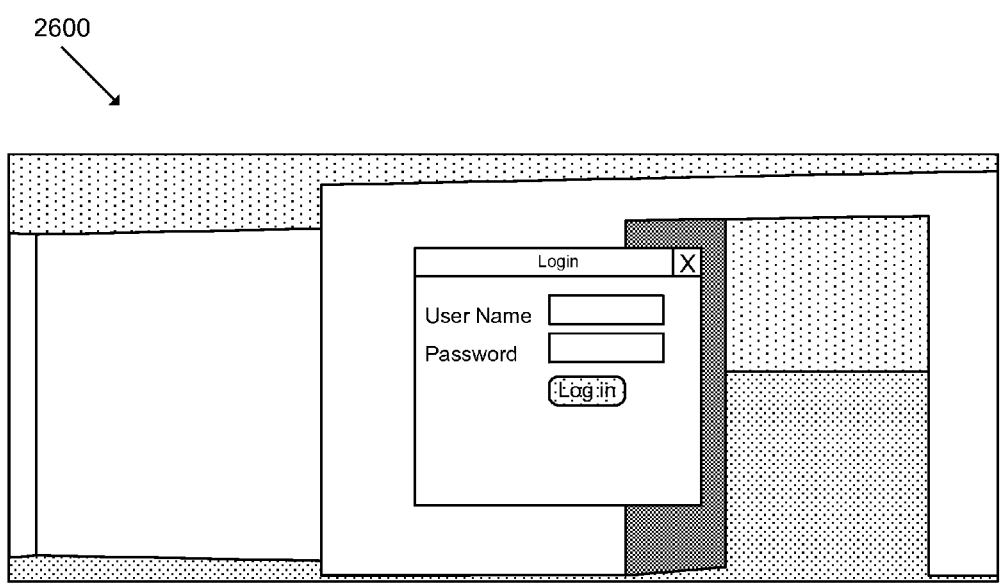
FIG. 26 illustrates a conceptual UI showing accommodation by some embodiments of traditional webpages in a 3D browsing session.

FIG. 26 illustrates a conceptual UI 2600 showing accommodation by some embodiments of traditional webpages in a 3D browsing session. The traditional webpage in this example is a simple login form with text boxes, labels, and submit button. The traditional webpage shown utilizes approximately one-fourth of the available width and one-third of the height for the viewable window size. Traditional pages may consume any percentage of the available viewable view and the size may be set in various appropriate ways (e.g., using default parameters, based on user selection, etc.).

L. Avatars and Movable Objects

Some embodiments incorporate avatars and/or other movable objects to represent real or fictitious scenery and allow perception of other users in a virtual community, city, etc. The placement of the avatars may be real-time based on virtual user location or computer projected locations in reference to other users. Additional viewable movable objects may include random computer-generated elements such as animals with movement, time connected patterns such as displaying sunrise and sunset, semi-random elements such as clouds following a simulated wind direction, and/or triggered movement such as a door opening when the avatar approaches.

The viewpoint or screen view of the user in relation to the user's avatar may include many alternatives such as from the simulated avatar eye perspective, from the location behind the avatar extending forward past the avatar, a scene overview, and/or a grid or map view.

Avatars and moveable objects will be described by reference to the example of FIG. 1.

The first avatar 110 may represent the virtual user in the 3D environment from a chase or behind view. Some embodiments may use a partially transparent avatar to follow the pan and walk movement while still identifying objects in front of the avatar. Some embodiments may hide the avatar altogether (i.e., providing a bird's eye view). Some embodiments may provide a scene view that shows the virtual user in a manner similar to the second avatar 120.

The second avatar 120 may represent a different user's avatar when the user associated with the second avatar interacts with the first user's browsing session. Avatars may be selected from among various options (e.g., humans, animals, mechanical elements, fictional characters, cartoons, objects, etc.). Avatars may be tracked and placed in real time, using time delay, and/or predicted movements.

Some avatars (and/or other appropriate elements), may represent objects that are computer-controlled instead of being associated with a user. For instance, animals such as cats, dogs, birds, etc. may roam around the 3D environment. Such movements may be random, preprogrammed, based on user interactions, based on positions of users, and/or may be implemented in various other appropriate ways.

The building 130 may represent a 3D website.

Scenery such as trees 160 and clouds 170 may also utilize computer-generated movement. For instance, trees 160 may wave and sway to create the appearance of wind. Clouds 170 may move based on an apparent wind direction and/or change shape as they move about the view.

Doors 140 may change appearance based on avatar movement. For instance, when the avatar walks toward a door, the door may open. As the avatar walks away from a door, the door may close. Avatar movement may also trigger movement in objects such as a direction compass 180. The compass rose may rotate to match the apparent facing direction when the user pans the view, for instance.

M. Sound as a Fourth Dimension

It is desirable to add sound to the Virtual Communities that can imitate and enhance the perception of virtual distance and obstructions from the virtual source by altering the volume and/or other sound characteristics.

Some embodiments may alter audio content such that it relates to the virtual distance to the virtual source (and/or the presence of any obstructions). Sounds from various sources may be blended at volume levels proportional to the originating volume levels and the virtual distance from the originating virtual locations to the virtual user's location. Objects such as doors may completely silence sound when closed, while other obstructions might only dampen the volume. The relative virtual position of the virtual user may be used to provide each user within the same virtual community with a unique sound experience.

Figure 27:
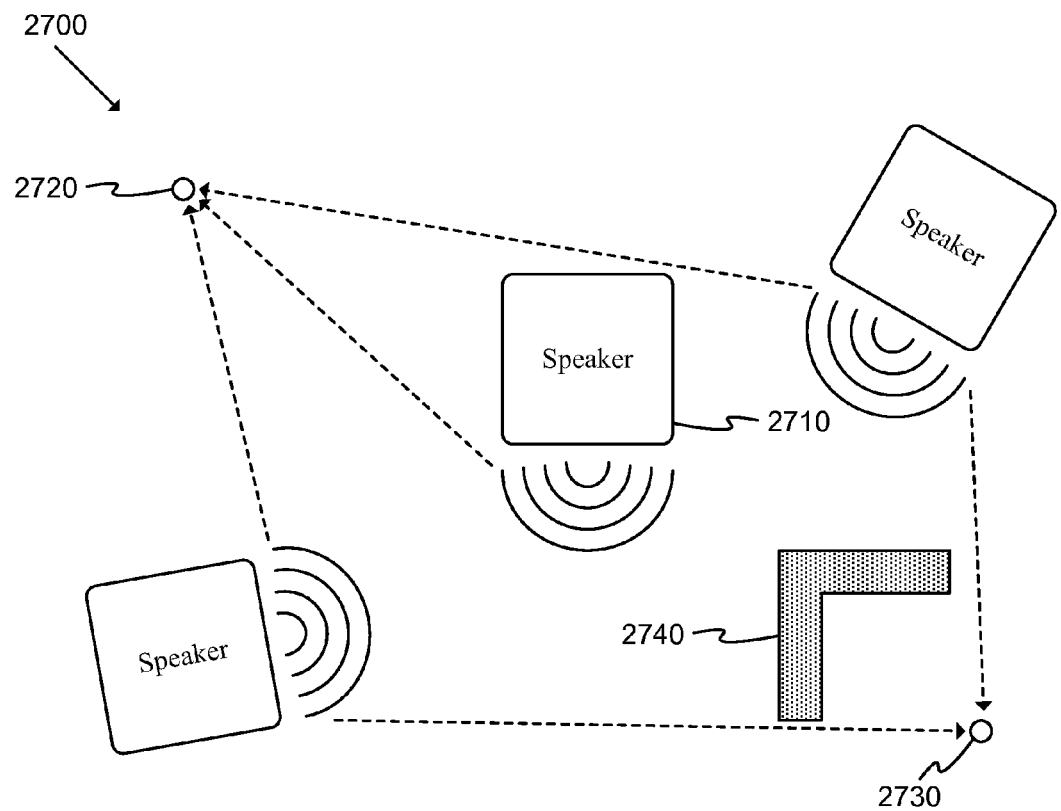
FIG. 27 illustrates a top view of a conceptual arrangement that uses sound as a fourth dimension to a 3D browsing session as provided by some embodiments.

FIG. 27 illustrates a top view of a conceptual arrangement 2700 that uses sound as a fourth dimension to a 3D browsing session as provided by some embodiments. The example of FIG. 27 includes three sound sources 2710, a first position 2720, a second position 2730, and an obstruction 2740.

The perceived volume of each sound source may be based on the defined volume of the source and the relative distance to the source. Perceived volume may be inversely proportional to distance. For example, two sources with the same volume may be perceived by the user as a first source with a particular volume and a second source with half the particular volume when the second source is twice the distance from the user as the first source. The perceived sound may be a combination of sounds from all sources that are able to be heard by the user.

In the example arrangement 2700, the first position 2720 may allow a user to hear all three speakers 2710. In contrast, a user as the second position 2730 may only hear two speakers 2710 as the obstruction 2740 blocks one of the speakers 2710.

Sound may also play a key role in assisting users with disabilities in browsing the highly interactive 3D building websites. Sound may assist with keeping a user on target toward a particular structure or object by increasing volume as the user approaches. Sounds may also be assigned key navigational functions. For example, sound may be tied to the direction of the compass as the user pans the view with extra clicks or beeps at ninety, one hundred eighty, and two hundred seventy degrees. As another example, sounds may be played at set walking distances.

N. Time as an Additional Dimension

Because of the calculated movement and location information generated by a 3D browsing session, some embodiments may allow users to record, pause, rewind, fast-forward, and playback 3D browsing sessions. This information may allow a user to imitate the panning and/or walking movement of a chosen user at any referenced point in time. With this information, some embodiments may allow users to stage and record scenes that other users may then be able to experience. For example, a virtual user may be taken on a virtual tour of a building or an animated recreation of a point in history may be created. The user may also return to any point in time from a previously recorded experience and replay or alter their interaction with the animated scene.

Figure 28:
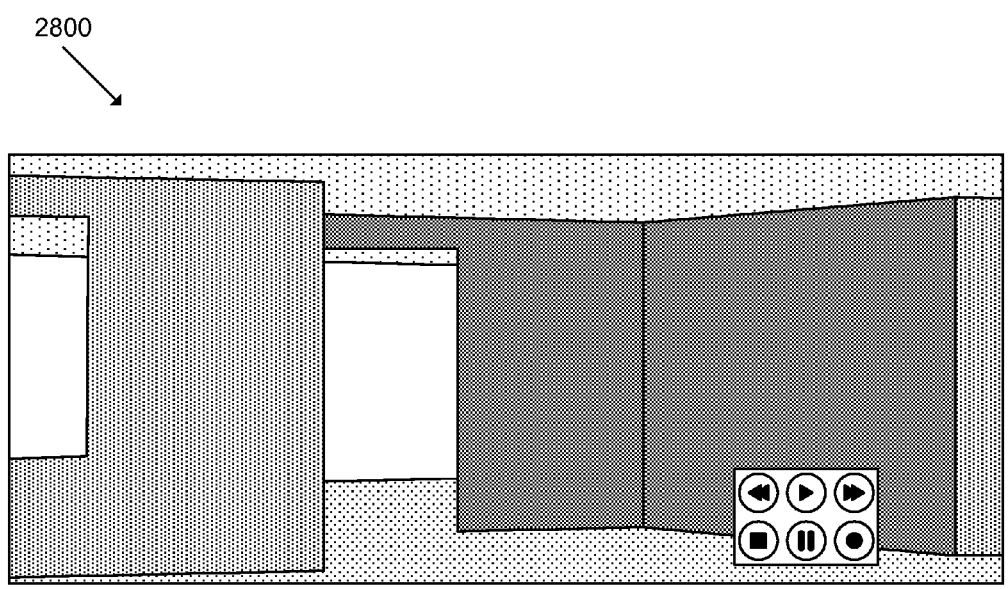
FIG. 28 illustrates a conceptual UI showing various playback control options that may be provided by some embodiments.

FIG. 28 illustrates a conceptual UI 2800 showing various playback control options that may be provided by some embodiments. The playback control may provide, to a user, the ability to pause, stop, rewind, fast-forward, and/or record a 3D browsing session. Animated playback and recording may be obtained by combining the grid, buildings, objects, user movement coordinates, walk direction, pan view angle, timestamp, and/or other appropriate information.

O. 3D Site Design

Some embodiments may allow users to create custom structure definitions and/or 3D building websites. Screen views and design grids may be used to create, alter, and style structure definitions. Such 3D implementation of some embodiments may be applied to, for instance, search engines, social networks, auctions, ecommerce, shopping malls, blogs, communications, government agencies, educational organizations, nonprofit organizations, profit organizations, corporations, businesses, and personal uses.

As one example, a virtual user may walk up to a kiosk located at the end of a search engine street and enter a search query. The buildings on that street may then collapse to the foundation and new buildings may arise representing the content related to the search query. Each building may have key information related to the search readily available as the virtual user "widow shops" down the street to view the search results.

As another example, a social network may allow users to create their own rooms, buildings, structures, objects, and virtual communities.

Some embodiments may allow users to integrate communication elements such as blogs, chat, instant messaging, email, audio, telephone, video conference, and voice over IP. Some embodiments may also incorporate translators such that different nationalities may communicate seamlessly.

The present invention may be applied to social networks by providing users with tools to create, style, and modify 3D structures and objects, join and create communities, invite other user as neighbors to a community, and provide communication via posting messages and multimedia among communities.

Figure 29:
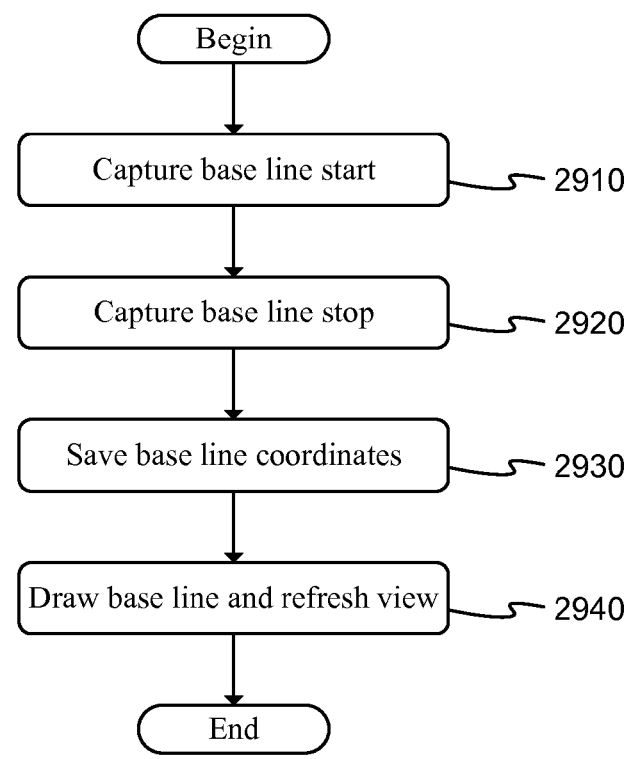
FIG. 29 illustrates a flow chart of a conceptual process used by some embodiments to add base lines to a design grid.

FIG. 29 illustrates a flow chart of a conceptual process 2900 used by some embodiments to add base lines to a design grid. User inputs received via the event listener of some embodiments may trigger the process.

The process may capture (at 2910) the base line start point (e.g., by recognizing a mouse click at a location within a design grid). A line may be drawn on the design grid view from the start point to the current pointer position as an animated line drawing.

Next, the process may capture (at 2920) the base line stop point. The event listener may identify a stop point in various appropriate ways (e.g., when a user releases a mouse click).

The process may then save (at 2930) the base line coordinates, draw (at 2940) the base line and refresh the view, and then end.

Figure 30:
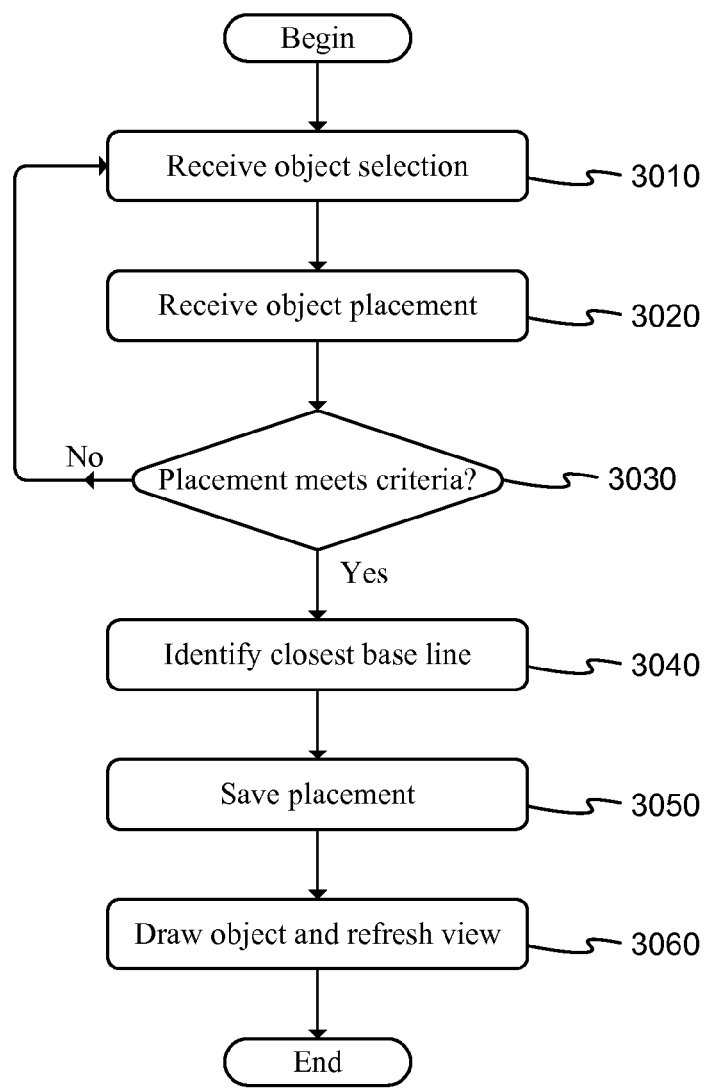
FIG. 30 illustrates a flow chart of a conceptual process used by some embodiments to add objects to a design grid.

FIG. 30 illustrates a flow chart of a conceptual process 3000 used by some embodiments to add objects to a design grid. As shown, the process may receive (at 3010) an object selection. For instance, some embodiments may provide edit tools that include images of selectable objects such as windows and doors.

The process may then receive (at 3020) a placement for the selected object. For instance, a user may be able to drag and drop an object selected from the edit tools onto the design grid (and/or place such elements in various other appropriate ways).

For the example of placing a door, a user may select the door, move the door to a location over a base line, and then release the door.

The process may then determine (at 3030) whether the placement meets any placement criteria. Such criteria may include space limitations (e.g., is the object too wide to fit along the selected baseline), conflicts (e.g., does the object overlap a conflicting object), and/or other appropriate criteria.

If the process determines (at 3030) that the placement does not meet the criteria, an error may be generated and the process may revert back to the original screen view. Operations 3010-3030 may be repeated until the process determines (at 3030) that the placement meets the criteria, at which point the process may determine the stop coordinates and identify (at 3040) the closest base line.

Next, the process may save (at 3050) the placement. The saved placement may include information such as the object type, base line identifier, and location. The process may then draw (at 3060) the object and refresh the screen view with the object properly located on the base line (or other appropriate location) and then may end.

One of ordinary skill in the art will recognize that the various processes described above may be implemented in various different ways without departing from the spirit of the invention. For instance, each process may be divided into a set of sub-processes and/or performed as a sub-process of a macro process. As another example, different embodiments may perform additional operations, omit operations, and/or perform operations in a different order than described. Some embodiments may repeatedly perform processes and/or operations. Such processes and/or operations thereof may be repeated iteratively based on some criteria.

One of ordinary skill in the art will recognize that the various example UI features described above may be implemented in various different ways than shown. For instance, different embodiments may include elements having different colors, textures, shapes, and/or other different qualities than those shown. In addition, various different elements may be included or omitted.

III. Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, Digital Signal Processors (DSPs), Application-Specific ICs (ASICs), Field Programmable Gate Arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be adapted to perform functions and/or features that may be associated with various software elements described throughout.

Figure 31:
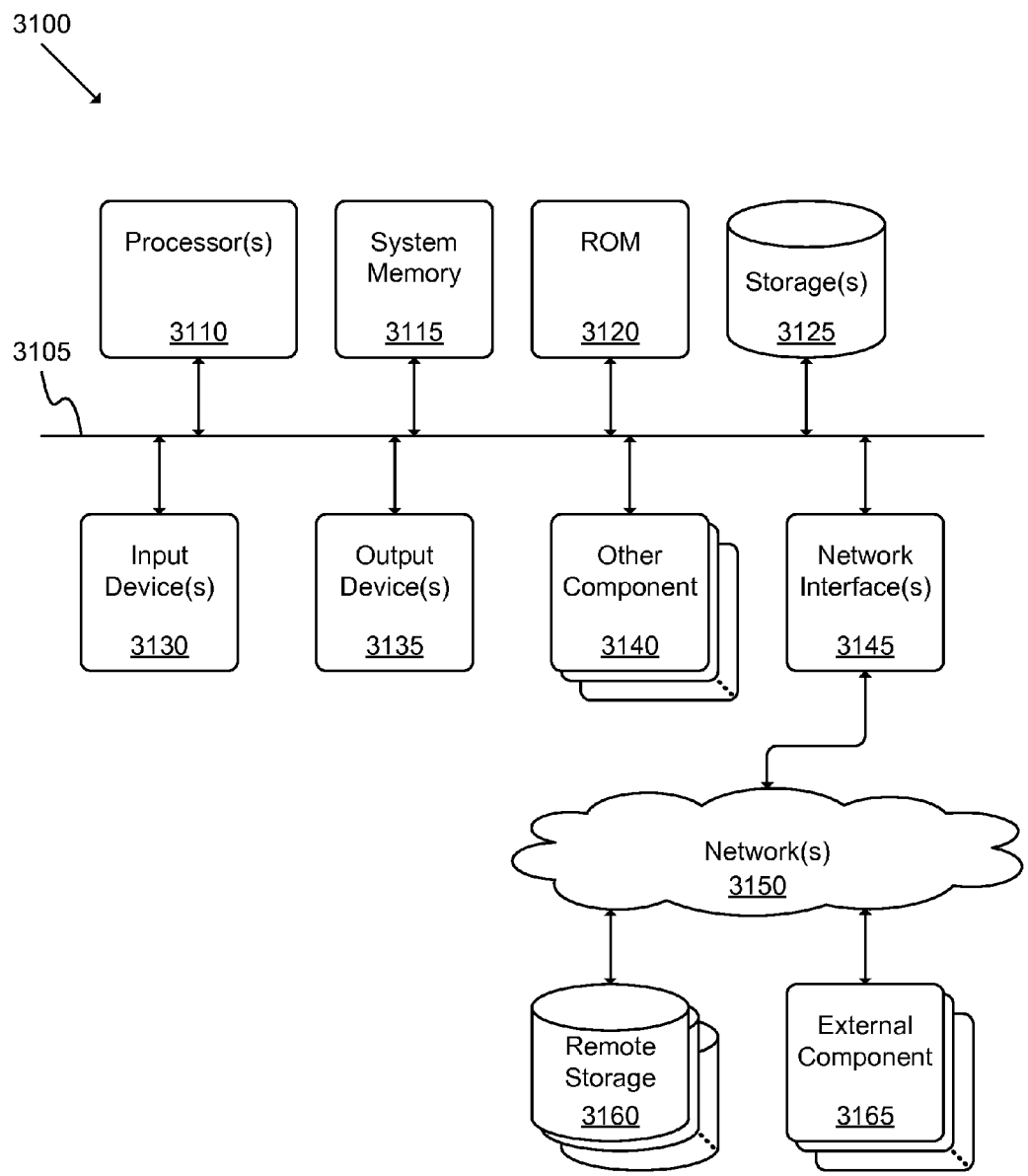
FIG. 31 illustrates a schematic block diagram of a conceptual computer system used to implement some embodiments of the invention.

FIG. 31 illustrates a schematic block diagram of a conceptual computer system 3100 used to implement some embodiments of the invention. For example, the processes described in reference to FIGS. 6-8, 12, 15, 18, 23-24, 29 and 30 may be at least partially implemented using sets of instructions that are executed using computer system 3100.

Computer system 3100 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 3100 may include at least one communication bus 3105, one or more processors 3110, a system memory 3115, a read-only memory (ROM) 3120, permanent storage devices 3125, input devices 3130, output devices 3135, various other components 3140 (e.g., a graphics processing unit), and one or more network interfaces 3145.

Bus 3105 represents all communication pathways among the elements of computer system 3100. Such pathways may include wired, wireless, optical, and/or other appropriate communication pathways. For example, input devices 3130 and/or output devices 3135 may be coupled to the system 3100 using a wireless connection protocol or system.

The processor 3110 may, in order to execute the processes of some embodiments, retrieve instructions to execute and/or data to process from components such as system memory 3115, ROM 3120, and permanent storage device 3125. Such instructions and data may be passed over bus 3105.

System memory 3115 may be a volatile read-and-write memory, such as a random access memory (RAM). The system memory may store some of the instructions and data that the processor uses at runtime. The sets of instructions and/or data used to implement some embodiments may be stored in the system memory 3115, the permanent storage device 3125, and/or the read-only memory 3120. ROM 3120 may store static data and instructions that may be used by processor 3110 and/or other elements of the computer system.

Permanent storage device 3125 may be a read-and-write memory device. The permanent storage device may be a non-volatile memory unit that stores instructions and data even when computer system 3100 may be off or unpowered. Computer system 3100 may use a removable storage device and/or a remote storage device as the permanent storage device.

Input devices 3130 may enable a user to communicate information to the computer system and/or manipulate various operations of the system. The input devices may include keyboards, cursor control devices, audio input devices and/or video input devices. Output devices 3135 may include printers, displays, and/or audio devices. Some or all of the input and/or output devices may be wirelessly or optically connected to the computer system.

Other components 3140 may perform various other functions. These functions may include performing specific functions (e.g., graphics processing, sound processing, etc.), providing storage, interfacing with external systems or components, etc.

Finally, as shown in FIG. 31, computer system 3100 may be coupled to one or more networks 3150 through one or more network interfaces 3145. For example, computer system 3100 may be coupled to a web server on the Internet such that a web browser executing on computer system 3100 may interact with the web server as a user interacts with an interface that operates in the web browser. Computer system 3100 may be able to access one or more remote storages 3160 and one or more external components 3165 through the network interface 3145 and network 3150. The network interface(s) 3145 may include one or more application programming interfaces (APIs) that may allow the computer system 3100 to access remote systems and/or storages and also may allow remote systems and/or storages to access computer system 3100 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" may be entirely restricted to tangible, physical objects that store information in a form that may be readable by electronic devices. These terms exclude any wireless or other ephemeral signals.

It should be recognized by one of ordinary skill in the art that any or all of the components of computer system 3100 may be used in conjunction with the invention. Moreover, one of ordinary skill in the art will appreciate that many other system configurations may also be used in conjunction with the invention or components of the invention.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments of the invention and modifications may be made without departing from the spirit and scope of the invention as defined by the following claims.

I claim:

1. A non-transient computer readable medium comprising sets of instructions for:
   receiving, at a processor, a selection of a first website;
   receiving, at the processor, a set of structure definitions associated with the first website, if the set of structure definitions is available at the first website;
   generating, at the processor, the set of structure definitions using a set of generic structure definitions and content associated with the first website, if the set of structure definitions is not available at the first website; and
   rendering, by the processor to a two dimensional (2D) display, a three dimensional (3D) perspective view of a set of virtual structures at least partly defined by the set of structure definitions, wherein:
   the virtual structures comprise 2D web content associated with the first website, and
   each structure definition in the set of structure definitions comprises at least one of graph points, colors, styles, and textures associated with a particular virtual structure and the particular virtual structure is one of a 3D rendered community, a 3D rendered world, a 3D rendered galaxy, a 3D rendered building, a 3D rendered room, and a 3D rendered object.

2. The non-transient computer readable medium of claim 1, wherein the set of structure definitions comprises at least one 3D structure definition.

3. The non-transient computer readable medium of claim 2, wherein the 3D structure definition comprises at least one of:

a set of base line definitions, each base line definition comprising a set of end points, specified using a 2D position grid, that at least partly define a base line path, and a 3D geometric object, including a set of values representing at least one of 3D position coordinates specified using a 3D position grid, 3D rotation, geometric shape, and physical features including at least one of texture, opacity, lighting, shading, shadow, and reflection.

4. The non-transient computer readable medium of claim 3, wherein at least one of:

at least one base line is associated with a door and the door position is at least partly defined by a set of points, specified using the 2D position grid, along the base line path, and at least one 3D geometric object is associated with an action trigger that is at least partly defined by a set of points specified using the 3D position grid.

5. The non-transient computer readable medium claim 3, wherein the door is associated with a second website.

6. The non-transient computer readable medium of claim 1, wherein the set of structure definitions comprises at least one of:

a set of room definitions, wherein each room definition is associated with a particular web page; and a set of building definitions, wherein each building definition is associated with a particular web site.

7. The non-transient computer readable medium of claim 1, further comprising sets of instructions adapted to:

receive commands from an input element; and adjust the 3D perspective view based at least partly on the received commands.

8. The non-transient computer readable medium of claim 1 further comprising:

identifying a set of websites within a surrounding zone of the first website;

receiving a set of structure definitions associated with each website within the set of websites; and rendering, to the 2D display, a 3D perspective view of a set of surrounding virtual structures at least partly defined by the set of structure definitions.

9. An automated method that generates a three dimensional (3D) rendered view of two-dimensional (2D) web content, the method comprising:

receiving a selection of a first website via a first uniform resource locator (URL);

retrieving at least one of 2D web content and a set of structure definitions from the first website, each structure definition in the set of structure definitions comprising at least one of graph points, colors, styles, and textures associated with a particular virtual structure and the particular virtual structure is one of a 3D rendered community, a 3D rendered world, a 3D rendered galaxy, a 3D rendered building, a 3D rendered room, and a 3D rendered object;

generating a first set of 3D elements based at least partly on at least one of the 2D web content and the set of structure definitions retrieved from the first website;

rendering a view, based on a current position of a virtual user, of the first set of 3D elements to a display;

identifying a movement associated with the current position of the virtual user;

retrieving at least one of 2D web content and a second set of structure definitions from a second website via a second URL associated with the current position of the virtual user;

generating a second set of 3D elements based at least partly on at least one of the 2D web content and the second set of structure definitions retrieved from the second website;

identifying a subset of the first set of 3D elements associated with the current position of the virtual user; and rendering the view, based on the current position of the virtual user, of the second set of 3D elements and the subset of the first set of 3D elements to the display.

10. The automated method of claim 9, wherein the first set of 3D elements includes at least one structure comprising a set of structure definitions and a set of portal definitions.

11. The automated method of claim 10, wherein the set of portal definitions comprises at least one of a door and an action triggered load zone associated with the second website and wherein the first website and the second website are associated with a connecting grid comprising a rigid or elastic 3D coordinate system.

12. The automated method of claim 10, wherein at least a portion of the retrieved content is displayed on a wall of the structure.

13. The automated method of claim 9, wherein the first URL comprises a position and the view of the first set of 3D elements at least partly depends on the position.

14. The automated method of claim 13, wherein the first URL further comprises a view angle and the view of the first set of 3D elements at least partly depends on the view angle.

15. An automated method adapted to generate a continuous browsing experience, the method comprising:

receiving a selection of a first website via a uniform resource locator (URL); identifying a first set of surrounding websites based at least partly on a position of the first website within a connecting grid;

presenting a three dimensional (3D) view of at least one of two dimensional (2D) content and a set of structure definitions associated with the first website and the first set of surrounding websites, each structure definition in the set of structure definitions comprising at least one of graph points, colors, styles, and textures associated with a particular virtual structure and the particular virtual structure is one of a 3D rendered community, a 3D rendered world, a 3D rendered galaxy, a 3D rendered building, a 3D rendered room, and a 3D rendered object;

monitoring a relative position within the 3D view;

determining that the relative position is within a first threshold distance of a first element within the 3D view, wherein the first element is associated with a second website from among the first set of surrounding websites and the first element is one of a door and an action triggered load zone, wherein the second website is retrieved using a partial page callback;

determining that the relative position is outside of a second threshold distance of the first element;

identifying a second set of surrounding websites based at least partly on a position of the second website within the connecting grid;

presenting a 3D view of content associated with the second website and the second set of surrounding websites; and removing content associated with websites included in the first set of websites and not included in the second set of websites.

16. The automated method of claim 15, wherein the connecting grid comprises a plurality of zones, each zone associated with an anchor position within the connecting grid.

* * * * *